United States Patent
Yokoyama et al.

(10) Patent No.: US 10,542,184 B2
(45) Date of Patent: Jan. 21, 2020

(54) PHOTOELECTRIC CONVERSION DEVICE, DEFECTIVE PIXEL DETERMINING METHOD, IMAGE FORMING APPARATUS, AND RECORDING MEDIUM

(71) Applicants: Takuhei Yokoyama, Kanagawa (JP); Hiroki Shirado, Kanagawa (JP); Masamoto Nakazawa, Kanagawa (JP)

(72) Inventors: Takuhei Yokoyama, Kanagawa (JP); Hiroki Shirado, Kanagawa (JP); Masamoto Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 26 days.

(21) Appl. No.: 15/878,467

(22) Filed: Jan. 24, 2018

(65) Prior Publication Data

US 2018/0213124 A1   Jul. 26, 2018

(30) Foreign Application Priority Data

Jan. 25, 2017   (JP) .................................. 2017-011256
Jan. 10, 2018   (JP) .................................. 2018-002010

(51) Int. Cl.
*H04N 1/58*   (2006.01)
*H04N 5/367*   (2011.01)
(Continued)

(52) U.S. Cl.
CPC .............. *H04N 1/58* (2013.01); *H04N 5/361* (2013.01); *H04N 5/367* (2013.01);
(Continued)

(58) Field of Classification Search
CPC .......... H04N 1/58; H04N 1/401; H04N 5/361; H04N 1/4076; H04N 5/367; H04N 5/3694; H04N 2201/0081; H04N 2201/0094
(Continued)

(56) References Cited

U.S. PATENT DOCUMENTS

2007/0188638 A1   8/2007   Nakazawa et al.
2008/0218610 A1*  9/2008   Chapman ............... H04N 5/367
                                                          348/246
(Continued)

FOREIGN PATENT DOCUMENTS

JP   2005-045552   2/2005
JP   2006-254388   9/2006
(Continued)

OTHER PUBLICATIONS

U.S. Appl. No. 15/600,156, filed May 19, 2017, Naoki Goh, et al.
(Continued)

*Primary Examiner* — Quang N Vo
(74) *Attorney, Agent, or Firm* — Oblon, McClelland, Maier & Neustadt, L.L.P.

(57) ABSTRACT

A photoelectric conversion device includes a photoelectric conversion element to generate an image signal according to an intensity of light being input and circuitry. The circuitry obtains pixel values in dark time, respectively, for at least a first time and a second time. The second time is longer than the first time. The pixel values in dark time represent pixel values obtained when no light is input to the photoelectric conversion element. The circuitry obtains a subtraction between the pixel values for the first time and the pixel values for the second time. The circuitry detects a noise amount based on the subtraction. The circuitry determines at least one pixel having the detected noise amount that is equal to or greater than a predetermined first threshold value, as a defective pixel of the photoelectric conversion element.

17 Claims, 20 Drawing Sheets

(51) Int. Cl.
*H04N 5/361* (2011.01)
*H04N 5/369* (2011.01)

(52) U.S. Cl.
CPC ... *H04N 5/3694* (2013.01); *H04N 2201/0081* (2013.01); *H04N 2201/0094* (2013.01)

(58) Field of Classification Search
USPC ................ 358/463, 1.9, 1.15, 518, 525, 448
See application file for complete search history.

(56) References Cited

U.S. PATENT DOCUMENTS

| | | |
|---|---|---|
| 2008/0252787 A1 | 10/2008 | Nakazawa et al. |
| 2010/0027061 A1 | 2/2010 | Nakazawa |
| 2010/0171998 A1 | 7/2010 | Nakazawa |
| 2011/0026083 A1 | 2/2011 | Nakazawa |
| 2011/0051201 A1 | 3/2011 | Hashimoto et al. |
| 2011/0063488 A1 | 3/2011 | Nakazawa |
| 2011/0304867 A1 | 12/2011 | Tokoyama et al. |
| 2012/0057211 A1 | 3/2012 | Shirado |
| 2012/0229866 A1 | 9/2012 | Miyazaki et al. |
| 2013/0063792 A1 | 3/2013 | Nakazawa |
| 2014/0043629 A1 | 2/2014 | Shirado |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2015/0098117 A1 | 4/2015 | Marumoto et al. |
| 2015/0116794 A1 | 4/2015 | Nakazawa |
| 2015/0163378 A1 | 6/2015 | Konno et al. |
| 2015/0222790 A1 | 8/2015 | Asaba et al. |
| 2015/0271385 A1* | 9/2015 | Shu .................... H04N 5/23212 348/297 |
| 2015/0288935 A1* | 10/2015 | Shinozaki ............ H04N 5/2176 348/322 |
| 2015/0304517 A1 | 10/2015 | Nakazawa et al. |
| 2016/0003673 A1 | 1/2016 | Hashimoto et al. |
| 2016/0006961 A1 | 1/2016 | Asaba et al. |
| 2016/0112660 A1 | 4/2016 | Nakazawa et al. |
| 2016/0119495 A1 | 4/2016 | Konno et al. |
| 2016/0173719 A1 | 6/2016 | Hashimoto et al. |
| 2016/0219163 A1 | 7/2016 | Shirado et al. |
| 2016/0268330 A1 | 9/2016 | Nakazawa et al. |
| 2016/0295138 A1 | 10/2016 | Asaba et al. |
| 2016/0373604 A1 | 12/2016 | Hashimoto et al. |
| 2017/0019567 A1 | 1/2017 | Konno et al. |
| 2017/0078599 A1* | 3/2017 | Higuchi .................. H04N 5/367 |
| 2017/0163836 A1 | 6/2017 | Nakazawa |
| 2017/0170225 A1 | 6/2017 | Asaba et al. |
| 2017/0201700 A1 | 7/2017 | Hashimoto et al. |
| 2017/0295298 A1 | 10/2017 | Ozaki et al. |
| 2017/0302821 A1 | 10/2017 | Sasa et al. |

FOREIGN PATENT DOCUMENTS

| | | |
|---|---|---|
| JP | 2014-110622 | 6/2014 |
| WO | WO2011/118286 A1 | 9/2011 |

OTHER PUBLICATIONS

U.S. Appl. No. 15/790,101, filed Oct. 23, 2017, Hiroki Shirado, et al.

U.S. Appl. No. 15/659,332, filed Jul. 25, 2017, Yoshio Konno, et al.

\* cited by examiner

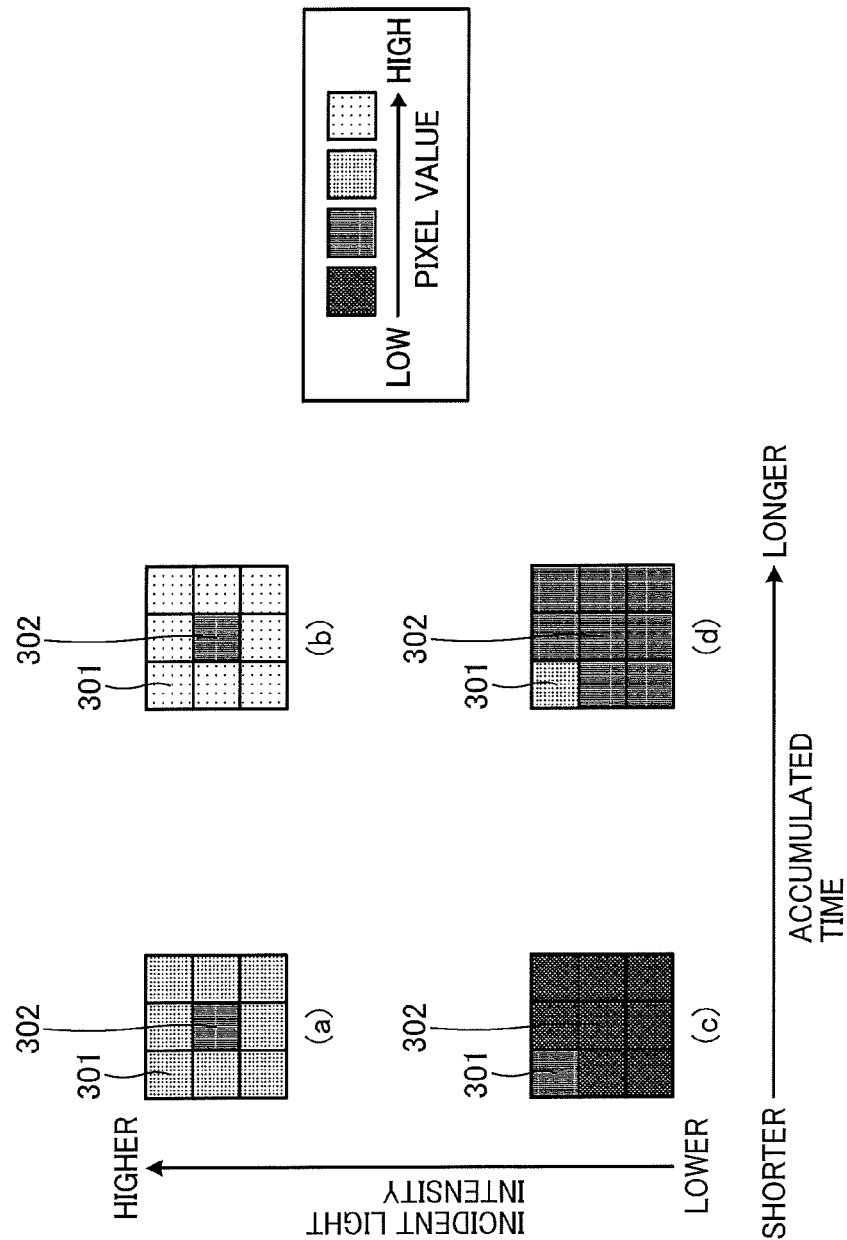

PHOTOELECTRIC
CONVERSION
ELEMENT

☐ NORMAL PIXEL

▨ WHITE-SPOT PIXEL

OBTAINED
IMAGE

MAIN SCAN

SUB SCAN

FIG. 15A

| RANK | PIXEL POSITION | NOISE AMOUNT (St2x-St1x) | | | MAX IN EACH CH |
|---|---|---|---|---|---|
| | | R | G | B | |
| 1 | 13 | 7 | 13 | 7 | 13 |
| 2 | 7 | 7 | 7 | 11 | 11 |
| 3 | 19 | 11 | 6 | 6 | 11 |
| 4 | 4 | 7 | 10 | 7 | 10 |
| 5 | 17 | 10 | 8 | 8 | 10 |
| 6 | 11 | 8 | 8 | 9 | 9 |
| - | 15 | 9 | 7 | 7 | 9 |
| - | 1 | 9 | 8 | 8 | 9 |

FIG. 15B

| RANK | PIXEL POSITION | NOISE AMOUNT (St2x-St1x) | | | MAX IN EACH CH |
|---|---|---|---|---|---|
| | | R | G | B | |
| 1 | 13 | 7 | 13 | 7 | 13 |
| 2 | 7 | 7 | 7 | 11 | 11 |
| 3 | 19 | 11 | 6 | 6 | 11 |
| 4 | 4 | 7 | 10 | 7 | 10 |
| 5 | 17 | 10 | 8 | 8 | 10 |
| 6 | 10 | 8 | 8 | 9 | 9 |
| - | 11 | 8 | 8 | 9 | 9 |
| - | 15 | 9 | 7 | 9 | 9 |
| - | 2 | 9 | 8 | 8 | 9 |
| - | 1 | 8 | 8 | 9 | 9 |

FIG. 15C

| RANK | PIXEL POSITION | NOISE AMOUNT (St2x-St1x) | | | MAX IN EACH CH |
|---|---|---|---|---|---|
| | | R | G | B | |
| 1 | 10 | 8 | 8 | 9 | 9 |
| 2 | 11 | 8 | 8 | 9 | 9 |
| 3 | 2 | 9 | 8 | 8 | 9 |
| 4 | 1 | 8 | 8 | 9 | 9 |
| 5 | 13 | 7 | 13 | 7 | 13 |
| 6 | 7 | 7 | 7 | 11 | 11 |
| - | 19 | 11 | 6 | 6 | 11 |
| - | 4 | 7 | 10 | 7 | 10 |
| - | 17 | 10 | 8 | 8 | 10 |
| - | 15 | 9 | 7 | 9 | 9 |

FIG. 15D

| RANK | PIXEL POSITION | NOISE AMOUNT (St2x-St1x) | | | MAX IN EACH CH |
|---|---|---|---|---|---|
| | | R | G | B | |
| 1 | 15 | 9 | 7 | 9 | 9 |
| 2 | 13 | 7 | 13 | 7 | 13 |
| 3 | 7 | 7 | 7 | 11 | 11 |
| 4 | 19 | 11 | 6 | 6 | 11 |
| 5 | 4 | 7 | 10 | 7 | 10 |
| 6 | 17 | 10 | 8 | 8 | 10 |
| - | 10 | 8 | 8 | 9 | 9 |
| - | 11 | 8 | 8 | 9 | 9 |
| - | 2 | 9 | 8 | 8 | 9 |
| - | 1 | 8 | 8 | 9 | 9 |

PHOTOELECTRIC CONVERSION DEVICE, DEFECTIVE PIXEL DETERMINING METHOD, IMAGE FORMING APPARATUS, AND RECORDING MEDIUM

CROSS-REFERENCE TO RELATED APPLICATION

This patent application is based on and claims priority pursuant to 35 U.S.C. § 119(a) to Japanese Patent Application No. 2017-011256, filed on Jan. 25, 2017 and Japanese Patent Application No. 2018-002010, filed on Jan. 10, 2018 in the Japan Patent Office, the entire disclosure of which is hereby incorporated by reference herein.

BACKGROUND

Technical Field

Embodiments of the present disclosure relate to a photoelectric conversion device, a defective pixel determining method, an image forming apparatus, and a recording medium.

One specific type of linear sensor formed of a charge-coupled device (CCD) or a complementary metal oxide semiconductor (CMOS) usually includes a defective pixel that causes failure due to an extremely low saturation level of electric charge or failure due to dark current. Such a defective pixel has a pixel value higher or lower than a normal pixel, which might cause a reduction in image quality. To avoid such a circumstance, a configuration is proposed to successfully detect and correct any defective pixel.

SUMMARY

In one aspect of this disclosure, there is provided an improved photoelectric conversion device including a photoelectric conversion element to generate an image signal according to an intensity of light being input and circuitry. The circuitry obtains pixel values in dark time, respectively, for at least a first time and a second time. The second time is longer than the first time. The pixel values in dark time represent pixel values obtained when no light is input to the photoelectric conversion element. The circuitry obtains a subtraction between the pixel values for the first time and the pixel values for the second time. The circuitry detects a noise amount based on the subtraction. The circuitry determines at least one pixel having the detected noise amount that is equal to or greater than a predetermined first threshold value, as a defective pixel of the photoelectric conversion element.

In another aspect of this disclosure there is provided an improved method of determining a defective pixel. The method includes obtaining pixel values in dark time, respectively, for at least a first time and a second time, the second time being longer than the first time, the pixel values in dark time representing pixel values obtained when no light is input to a photoelectric conversion element that generates an image signal according to an intensity of light being input; obtaining a subtraction between the pixel values for the first time and the pixel values for the second time, to detect a noise amount in the dark time based on the subtraction; and determining at least one pixel having the detected noise amount that is equal to or greater than a predetermined first threshold value, as a defective pixel of the photoelectric conversion element.

In even another aspect of this disclosure there is provided an improved image forming apparatus including circuitry to obtain pixel values for at least a first time and pixel values for a second time, the second time being longer than the first time, the pixel values in dark time representing pixel values obtained when no light is input to the photoelectric conversion element that receives light reflected by a document placed on a document tray; obtain a subtraction between the pixel values for the first time and the pixel values for the second time; detect a noise amount based on the subtraction; determine at least one pixel having the detected noise amount that is equal to or greater than a predetermined first threshold value, as a defective pixel of the photoelectric conversion element; and correct a pixel value determined as the defective pixel to have a pixel value of a normal pixel among pixel values of pixels of the photoelectric conversion element.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 6 is an illustration of image noise generated in a read image due to a defective pixel;

FIGS. 15A through 15D each is a table for describing an operation of storing defective pixels detected by the noise detector and the determiner, based on a predetermined priority order in the MPF according to an embodiment of the present disclosure;

Figure 1:
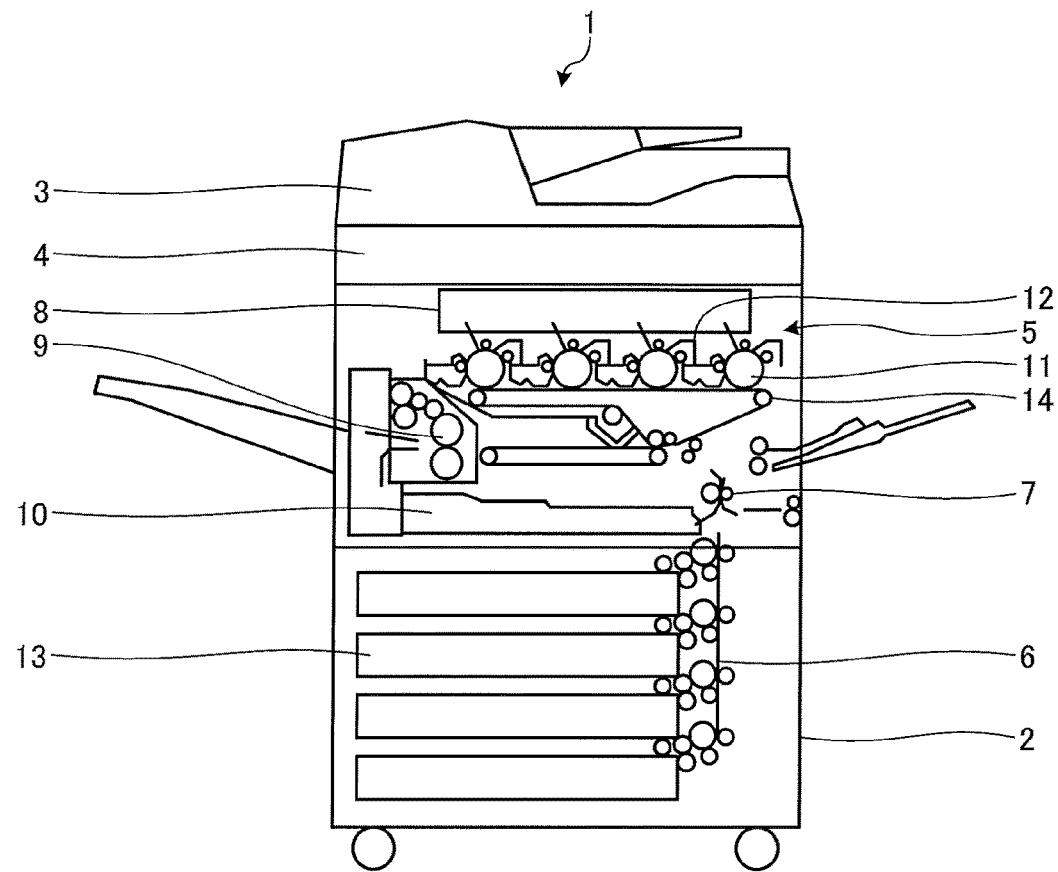
FIG. 1 is a cross-sectional side view of a multifunction peripheral (MFP) according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Firstly, a description is given of application fields. A photoelectric conversion device and a method of determining a defective pixel according to the embodiments of the present disclosure are applicable to devices that detect light and perform predetermined information processing as well as devices that read images. More specifically, the photoelectric conversion device and the photoelectric conversion method according to the embodiments of the present disclosure are applicable to, for example, a linear sensor used in the MFPs, a linear autofocus (AF) sensor for cameras and video cameras, and a line sensor for reading characters, symbols, and figures drawn in an interactive whiteboard (an electronic whiteboard). Hereinafter, a description is given of a multifunction peripheral (MFP) as an example, to which the photoelectric conversion device and the photoelectric conversion method according to at least one embodiment of the present disclosure are applied.

Configuration of MFP

FIG. 1 is a cross-sectional view of the MFP according to an embodiment of the present disclosure. FIG. 1 further illustrates the interior of a main body 2 of the MFP. As illustrated in FIG. 1, the MFP has a reading device 1 and the main body 2. The reading device 1 includes an automatic document feeder (ADF) 3 and a scanning device 4.

The main body 2 includes a tandem image forming device 5, a registration roller 7 that feeds a recording medium from a paper feeder 13 to the image forming device 5 through a conveyance path 6, an optical writing device 8, a fixing conveyance device 9, and a duplex tray 10. The image forming device 5 includes four photoconductor drums arranged side by side. The four photoconductor drums 11 correspond to four colors of yellow (Y), magenta (M), cyan (C), and black (B). Around each photoconductor drum 11, image forming elements such as a charger, a development device 12, a transfer device, a cleaner, and a discharger are disposed. Further, an intermediate transfer belt 14 is stretched out between a drive roller and a driven roller, such that the intermediate transfer belt 14 passes through a nip formed by the transfer device and the photoconductor drum 11.

In such a tandem image forming apparatus, the optical writing device 8 optically writes an image on the photoconductor drums 11 corresponding to the colors Y, M, C, and K, and the development device 12 develops an image with toner of each color. Thus, the photoconductor drums 11 primarily transfer the developed toner images onto the intermediate transfer belt 14 in order of the colors Y, M, C, and K. Then, the transfer device secondarily transfers a full-color image obtained by the primary transfer operation, in which the toner images of four colors are superimposed on each other, onto a recording medium. Subsequently, the fixing conveyance device fixes the full-color image onto the recording medium, and discharges the recording medium having the full-color image formed thereon.

Configuration of ADF and Scanner

Figure 2:
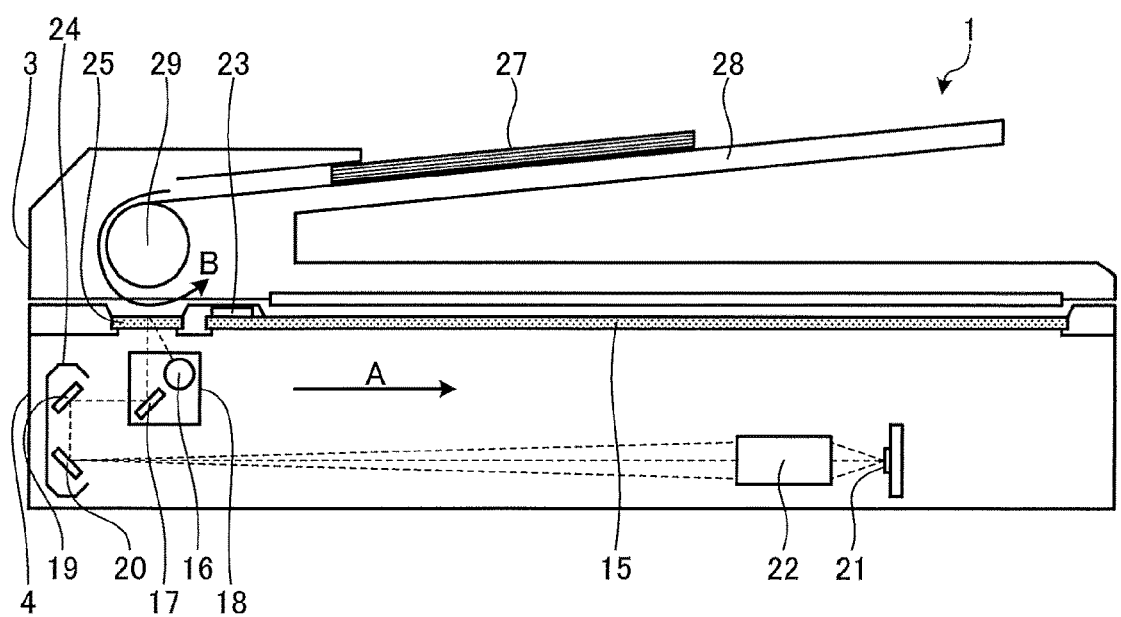
FIG. 2 is a cross-sectional side view of a reader mounted in the MFP of FIG. 1.

FIG. 2 is a cross-sectional view of the ADF 3 and the scanning device 4. The scanning device 4 includes a contact glass 15 on which a document is placed. Further, the scanning device 4 includes a first carriage 18 and a second carriage 24. The first carriage includes a light source 16 that exposes the document, and a first reflecting mirror 17. The second carriage 24 includes a second reflecting mirror 19 and a third reflecting mirror 20. The scanning device 4 also includes a lens unit 22 to form an image of light reflected from the third reflecting mirror 20 in a light-receiving area of a photoelectric conversion element 21. Further, the scanning device 4 includes a reference white board 23 used to correct various distortion caused by, for example, a reading optical system and a sheet-through reading slit 25. In the scanning device 4, the photoelectric conversion element 21 receives light reflected from a document illuminated with light emitted from the light source 16, and converts the received light into an electrical signal (image data), outputting the electrical signal.

The ADF 3 is attached with the main body 2 of the MFP via a hinge member so that the ADF 3 is opened and closed relative to the contact glass 15. The ADF 3 includes a document tray 28 on which a bundle of documents 27 is placed. The ADF 3 further includes a device to separate a document one by one from the bundle of documents 27 placed on the document tray 28, and automatically feeds the document to the sheet-through reading slit 25 using a feeding roller 29.

Operation of Reading Document

The above-described reading device 1 has a scan mode to read a document placed on the contact glass 15 and a sheet-through mode to read a document automatically fed by the ADF. Prior to the scan mode reading operation or sheet-through mode reading operation, the light source 16 emits light to the reference white board 23, and the photoelectric conversion element 21 reads an image according to the light reflected from the reference white board 23. Then, the photoelectric conversion element 21 generates and stores shading correction data such that each pixel of the image data for one line has a uniformed level. The stored shading correction data is used for the shading correction of the image data read in the scan mode or the sheet-through mode to be described below.

In the scan mode, the first carriage 18 and the second carriage 24 are moved by a stepping motor in a direction indicated by arrow A (a sub-scanning direction) to scan the document. At this time, the second carriage 24 moves at a speed half of the speed of the first carriage 18 so as to maintain the optical path length from the contact glass 15 to the light-receiving area of the photoelectric conversion element 21 at constant length.

At the same time, the image surface that is a lower surface of the document placed on the contact glass 15 is illuminated with (exposed to) the light emitted from the light source 15 of the first carriage 18. Then, the light reflected from the image surface is sequentially reflected by the first reflecting mirror 17 of the first carriage 18, the second reflecting mirror 19, and the third reflecting mirror 20 of the second carriage 24. The light reflected by the third reflecting mirror 20 is directed to and collected by the lens unit 22, forming an image at the light-receiving area of the photoelectric conversion element 21. The photoelectric conversion element 21 photoelectrically converts the received light for each line to an electric signal to thereby generate image data. The photoelectric conversion element 21 digitalizes the generated image data, and performs gain adjustment on the image data, outputting the image data. The document is discharged to a discharge port after being read.

In the sheet-through mode, the first carriage 18 and the second carriage 24 move to a position below the sheet-through reading slit 25 and stop. Thereafter, the bundle of the documents 27 on the document tray of the ADF 3 is automatically conveyed by the feeding roller 29 in a direction (the sub-scan direction) indicated by arrow B in FIG. 2, beginning from a lowermost document. The scanning device 4 scans a document passing through the position of the sheet-through reading slit 25.

At this time, the light source 16 of the first carriage 18 illuminates the lower surface (image surface) of the automatically fed document. Then, the light reflected from the image surface is sequentially reflected by the first reflecting mirror 17 of the first carriage 18, the second reflecting mirror 19, and the third reflecting mirror 20 of the second carriage 24. The light reflected by the third reflecting mirror 20 is directed to and collected by the lens unit 22, forming an image at the light-receiving area of the photoelectric conversion element 21. The photoelectric conversion element 21 photoelectrically converts the received light for each line to an electric signal to thereby generate image data. The photoelectric conversion element 21 digitalizes the generated image data, and performs gain adjustment on the image data, outputting the image data. The document is discharged to a discharge port after being read.

Hardware Configuration of MFP

Figure 3:
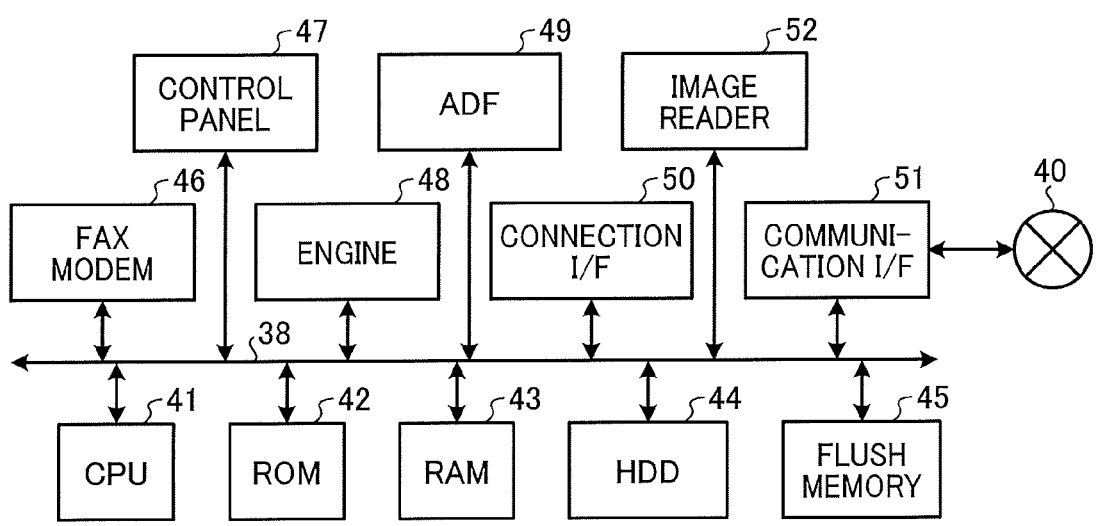
FIG. 3 is a schematic block diagram illustrating a hardware configuration of a multifunction peripheral (MFP) according to embodiments of the present disclosure.

Next, FIG. 3 is an illustration of a hardware configuration of the MFP. As illustrated in FIG. 3, the MFP includes a control processing unit (CPU) 41, a read only memory (ROM) 42, a random access memory (RAM) 43, a hard disk drive (HDD) 44, and a flash memory 45. Further, the MFP includes a facsimile (FAX) modem 46, a control panel 47, an engine 48, an ADF 49 (corresponding to the ADF 3 in FIGS. 1 and 2), a connection interface (connection I/F) 50, an image reader 52, and a communication I/F 51 that performs wired communication or wireless communication via a network such as the Internet. The above-described components, the CPU 41 to the image reader 52, are connected to each other via a system bus 18 in FIG. 3.

The CPU 41 comprehensively controls the operation of the MFP. The CPU 41 controls the entire operation of the MFP by executing programs stored in, e.g., the ROM 42 or the HDD 44, using the RAM 43 as a work area, to implement various functions such as a copier function, a scanner function, a facsimile function and a printer function as described above.

The engine 48 is hardware for performing processing other than data communication and general information processing, to implement the copier function, the scanner function, or the printer function. The engine 48 includes, for example, a scanner that scans and reads a character and an image on a document or a business card and a plotter that performs printing on a sheet such as paper. The facsimile modem 46 performs a facsimile communication.

Configuration of Photoelectric Conversion Element

Figure 4:
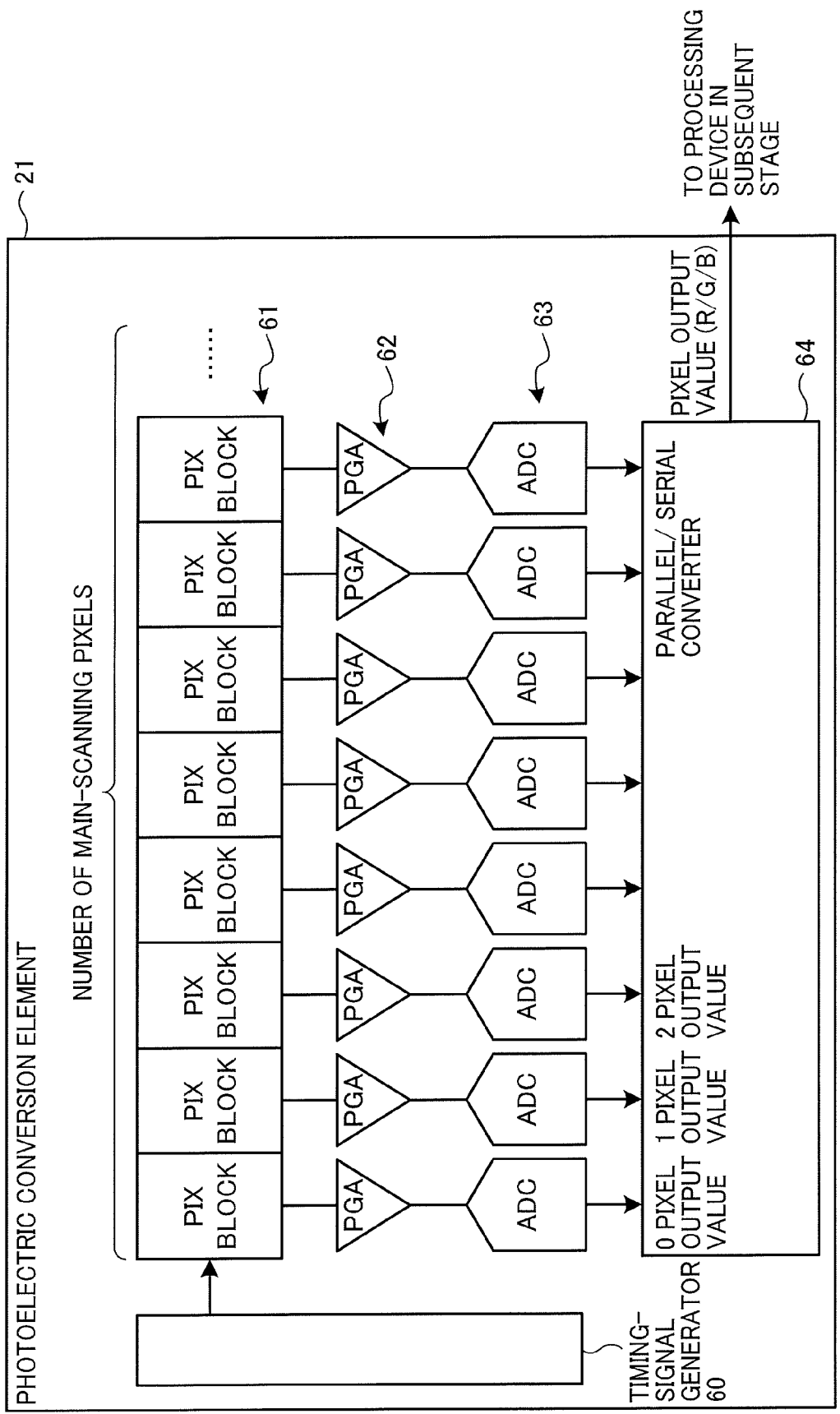
FIG. 4 is a block diagram of a photoelectric conversion element provided in the MFP of FIG. 1.

FIG. 4 is a detailed block diagram of the photoelectric conversion element 21 of FIG. 2. As an example, as shown in FIG. 4, the photoelectric conversion element 21 is a linear sensor in which pixels are arranged one-dimensionally along the main scanning direction. In the present embodiment, the main-scan direction is the direction in which the pixels are unidimensionally arranged, and the sub-scan direction is a direction two-dimensionally perpendicular to the main-scan direction.

As illustrated in FIG. 4, the photoelectric conversion element 21 includes the timing-signal generator 60, a pixel-signal generation circuit 61, an amplifier (programmable gain amplifier (PGA)) 62, and an analog-digital converter (ADC) 63. In the pixel-signal generation circuit 61, pixels are unidimensionally arranged. The PGA 62 amplifies each image signal with a predetermined gain. The ADC 63 digitalizes an image signal output from each PGA 62.

The photoelectric conversion element 21 further includes a parallel/serial converter 64 that converts the image signal supplied in parallel from the ADC 63 of each channel of RGB into a serial image signal, transmitting the serial image signal to the subsequent processing device. The output timing of the image-signal generation circuit 61 through output timing of the pixel-signal generation circuit 61 to the parallel/serial converter 64 are controlled by clock signals from the timing-signal generation unit 60.

When the photoelectric conversion element 21 is adaptable to colors, the pixel-signal generation circuit 61 is provided for each color channel of red, green, and blue (RGB) or yellow, magenta, and cyan (YMC). The PGA 62 and the ADC 63 are also provided for each color channel, respectively.

Circuit Configuration of Pixel-Signal Generation Circuit

Figure 5:
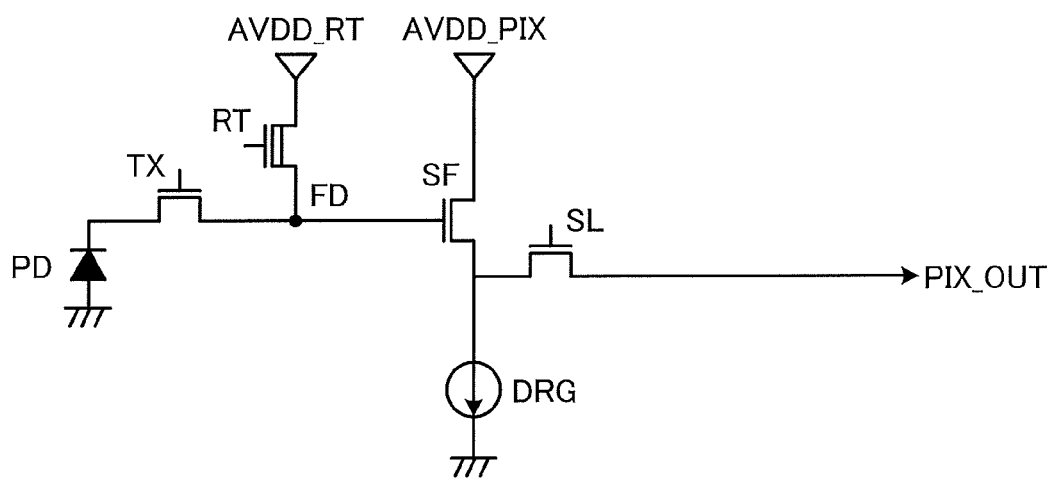
FIG. 5 is a circuit diagram of the photoelectric conversion element of FIG. 4 mounted in the MFP of FIG. 1.

FIG. 5 is a circuit diagram of a part of the pixel-signal generation circuit 61 corresponding to each pixel. Referring to FIG. 5, each pixel of the pixel-signal generation circuit 61 includes a photodiode PD as a photosensor and a floating diffusion FD that converts charges accumulated according to the amount of received light into a voltage. Each pixel of the pixel-signal generation circuit 61 includes a charge-transfer switch TX and a reset switch RT. The charge-transfer switch TX is to transfer charge accumulated in the photodiode PD to the floating diffusion FD. The reset switch RT is to reset the electrical potential in the floating diffusion FD to a rest electrical potential AVDD_RT. Each pixel of the pixel-signal generation circuit 61 further includes a source follower SF and a switch SL. The source follower SF is disposed between a source voltage AVDD_PIX and a current source DRG of the source follower SF. The switch SL is to transfer the image signal (Pix_out) subjected to voltage conversion to the subsequent PGA 62.

The transistor of the source follower SF has a threshold voltage that varies, which causes a circuit offset in an output signal without dependence on an intensity of incident light (light being input to the pixel-signal generation circuit 61). The circuit offset causes a fixed pattern noise (FPN) in an image, resulting in a reduction in image signal.

In one or some pixels, an extremely large or small amount of dark current occurs in the photodiode PD, with a fixed probability, due to heavy metal contamination or crystal defects generated in the process of manufacturing the photoelectric conversion element 21. Any pixel having an extremely large amount of dark current generated in the photodiode PD is referred to as a "white-spot pixel". Any other pixel has a small-capacity photodiode PD, i.e., having a low saturation level of electric charge. Such a pixel is referred to as a "black-spot pixel". The white-spot pixel and the black-spot pixel appear as dots, i.e., image noise in an image, each dot having a pixel value different from a pixel value of a normal pixel. Thus, a reduction in image quality occurs. The dark current noise component of the photodiode PD commensurately increases with time. The dark current noise component of the photodiode PD varies with temperature (temperature dependent). For example, the dark current noise component is doubled with an increase in temperature by 10° C.

Image Noise Caused by Defective Pixel

FIG. 6 illustrates various cases of image noise generated by an area sensor made of nine pixels including a white-spot pixel 301 and a black-spot pixel 302 in reading an image with different intensities of light and accumulation times. In FIG. 6, the horizontal axis represents the accumulation time of light in the photodiode PD, and the vertical axis represents an intensity of light (incident light) that enters the photodiode PD.

With a higher intensity of incident light as illustrated in (a) or (b) of FIG. 6, a signal component of light increases, which reduces the effect of dark current. Thus, image noise does not occur in the white-spot pixel 301. With a lower intensity of incident light as illustrated in (c) or (d) of FIG. 6, however, a pixel value of the white-spot pixel 301 is higher than the pixel value of the normal pixel, so that the white-spot pixel 301 appears as a brighter dot than the surrounding pixels, thus generating image noise. With a lower intensity of incident light as well as a longer accumulation time as illustrated in (d) of FIG. 6, image noise caused by the white-spot pixel 301 is more conspicuous.

The black-spot pixel 302 appears as a dark dot, i.e., image noise when receiving a higher intensity of light as illustrated in (a) or (b) of FIG. 6. This is because the pixel value of the black-spot pixel 302 is lower than the pixel value of the normal pixel. With a higher intensity of incident light as well as a longer accumulation time as illustrated in (b) of FIG. 6, image noise caused by the white-spot pixel 301 is more conspicuous. As illustrated in (c) or (d) of FIG. 6, the black-spot pixel 302 does not generate image noise when receiving a lower intensity of light. This is because the photodiode PD does not reach the saturation level of electric charge.

As described above, the white-spot pixel 301 degrades image quality of an image when it is dark, i.e., in dark time (when receiving a lower intensity of light). The black-spot pixel 302 degrades image quality of an image when it is light (when receiving a higher intensity of light). To above such a degradation in image quality, any defective pixels are preferably detected and corrected. Detecting the black-spot pixel 302 is easier than the white-spot pixel 301. This is because, when image data is obtained with, e.g., a long-time exposure, the black-spot pixel 302 appears as a dark dot while the normal pixel having reached the saturation level appears as a clear white image.

Image Noise Caused by Defective Pixel of Linear Sensor

Figure 7A:
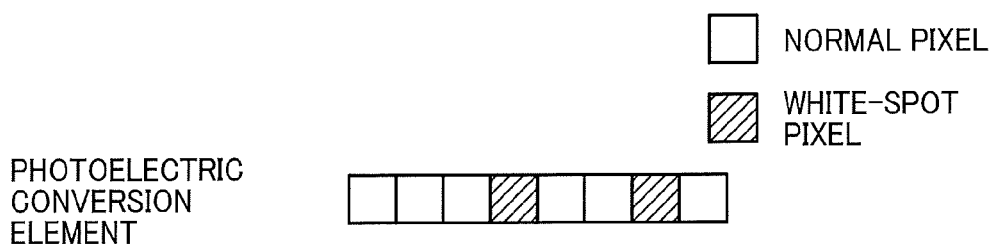
FIGS. 7A and 7B each is an illustration of image noise in a read image when a linear sensor includes a defective pixel.
Figure 7B:
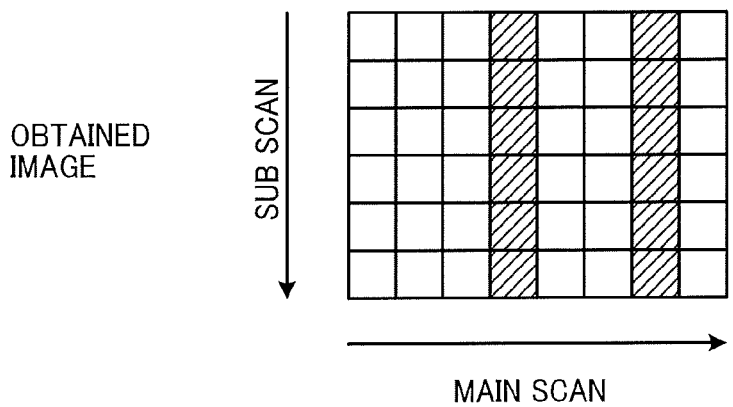

FIG. 7A is an illustration of a position of the white-spot pixel 301 in a linear sensor. The white-spot pixel 301 is represented by oblique lines. FIG. 7B is an illustration of a dark-time image (an image obtained without any exposure of the linear sensor to external light) captured by the linear sensor that includes the white-spot pixels 301. The white-spot pixel 301 has a pixel value higher than the pixel value of the normal pixel. For this reason, the linear sensor including the white-spot pixels 301 generates bright linear streaks (image noise) extending in a sub-scan direction. The linear streaks are generated by the images (pixels) at the positions corresponding to the white-spot pixels 301, those are brighter than the surrounding images (pixels surrounding the images of the white-spot pixels 301).

By contrast, the linear sensor, which includes the black-spot pixels 302, provides the opposite results of the above-described cases of the white-spot pixel 301. That is, the black-spot pixel 302 has a pixel value lower than the pixel value of the normal pixel. For this reason, the linear sensor including the black-spot pixels 302 generates dark linear streaks (image noise) extending in a sub-scan direction. The linear streaks (image noise) are generated by the images (pixels) corresponding to the black-spot pixels 302, which are darker than the surrounding images (pixels surrounding the images of the dark-spot pixels 302).

As described above, the linear sensor (that generates linear streaks (image noise)) exhibits adverse effects due to any defective pixels more significantly than the area sensor (that generates dots as image noise) does. The adverse effects due to the defective pixels are more conspicuous when a plurality of defective pixels is adjacent to each other.

Comparative Example of Defective Pixel Detection Method

Figure 8A:
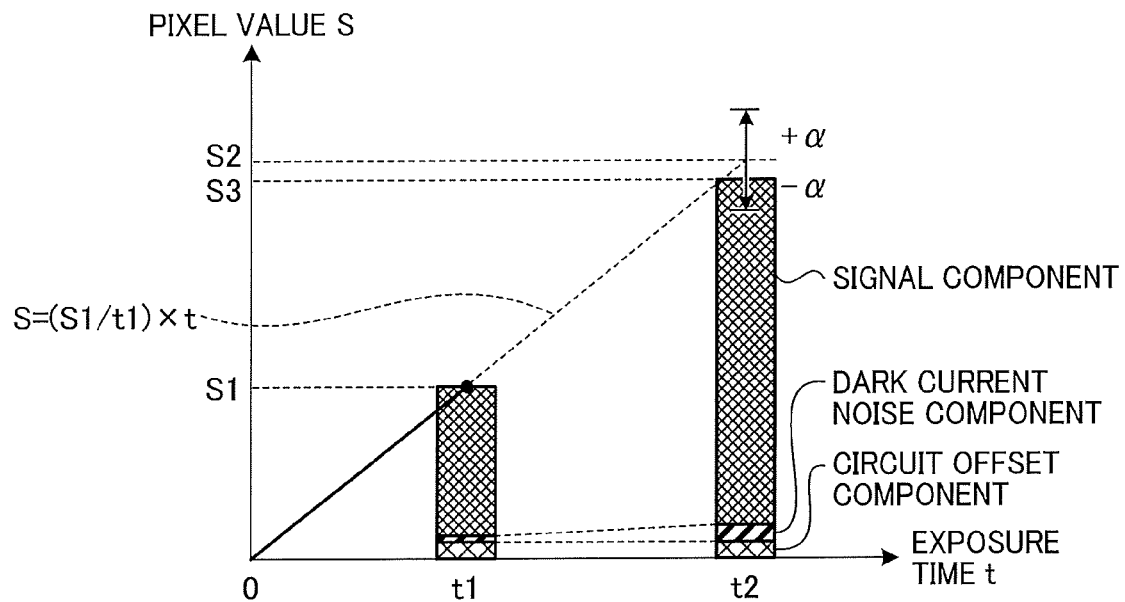
FIGS. 8A and 8B each is a graph for explaining a method for detecting a defective pixel according to a comparative example.
Figure 8B:
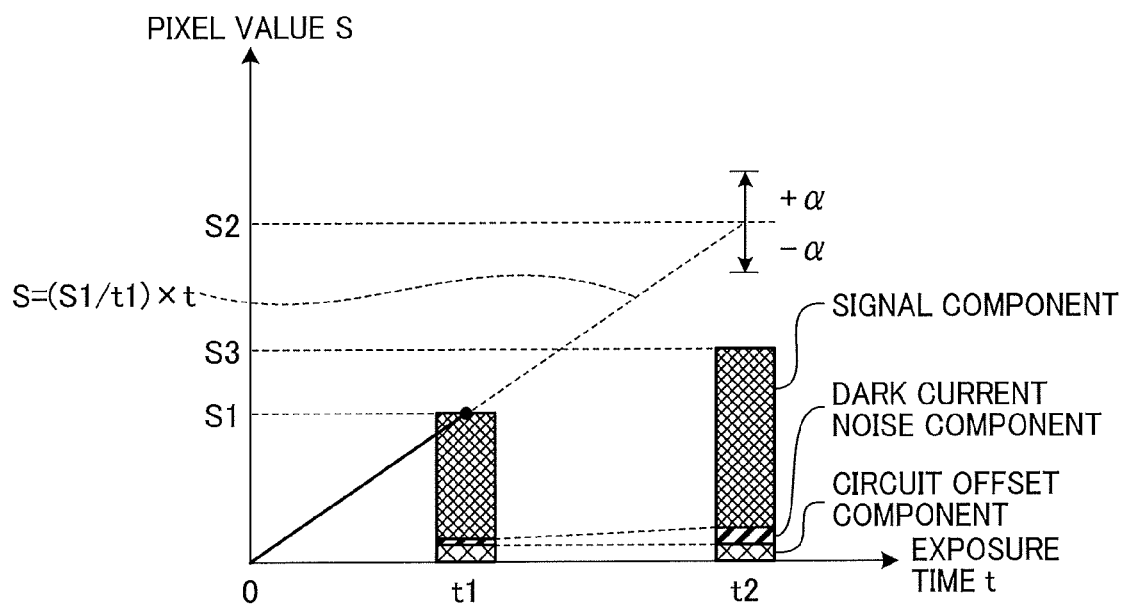

A description is given of a comparative example of a defective pixel detection method. Each of FIGS. 8A and 8B is a graph of pixel values obtained by imaging the same subject with different exposure times t1 and t2 (t2>t1). FIG. 8A is a graph of pixel values of the normal pixel used to image the subject. FIG. 8B is a graph of pixel values of the black-spot pixel 302 used to image the subject.

Assuming that, a pixel value S of 0 is obtained with an exposure time t of 0 and the pixel value S linearly changes with time, a change ratio of S1 to t1 (S1/t1) is calculated. Subsequently, an ideal pixel value S2 corresponding to the exposure time t2 is determined by using the calculated change ratio of S1 to t1 (S1/t1). The pixel value S2 is obtained by the arithmetic expression (1) below:

$$S2 = (S1/t1) \times t2 \qquad (1).$$

In actuality, the pixel value includes electrical noise. Accordingly, the pixel value S2 is assumed to have a margin of error (a fixed value) of ±α. The defective pixel detection method involves determining whether a pixel value S3 at the exposure time t2 is within the margin of ±α of the pixel value S2, so as to determine whether the pixel value S3 is a defective pixel. Note that, a dark-current component noise commensurately increases with time, same as the signal component. Each pixel of the photoelectric conversion element 21 has a fixed value for a circuit offset component. However, the dark-current noise component and the circuit offset component are smaller than the signal component. That is, the dark-current noise component and the circuit offset component do not have an adverse effect on the determination of the defective pixel.

In the case of the normal pixel as illustrated in FIG. 8A, the signal component linearly changes with the exposure time. As a result, the pixel value S3 falls within the margin of ±α of the pixel value S2, and thus the pixel value S3 is determined as a normal pixel. In the case of the black-spot pixel 302 by contrast, the black-spot pixel 302 has a lower saturation level of electric charge, thereby reaching the saturation level of electric charge to be accumulated in the photodiode PD with a lower pixel value at the exposure time t2 as illustrated in FIG. 8B. As a result, the pixel value S3 is smaller than the pixel value S2 of the normal pixel. Thus, the pixel value S3 fails to fall within the margin of ±α of the pixel value S2, and thus the pixel value S3 is determined as a defective pixel.

Difficulty in Defective Pixel Detection Method according to Comparative Example

Figure 9A:
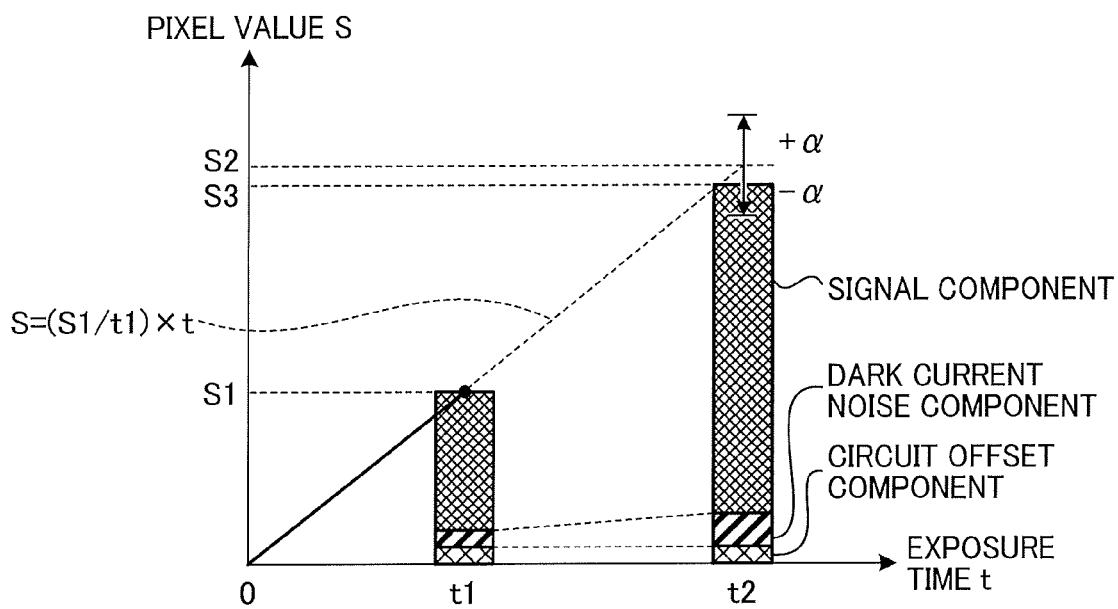
FIGS. 9A and 9B each is another graph for explaining the method for detecting a defective pixel according to another comparative example.
Figure 9B:
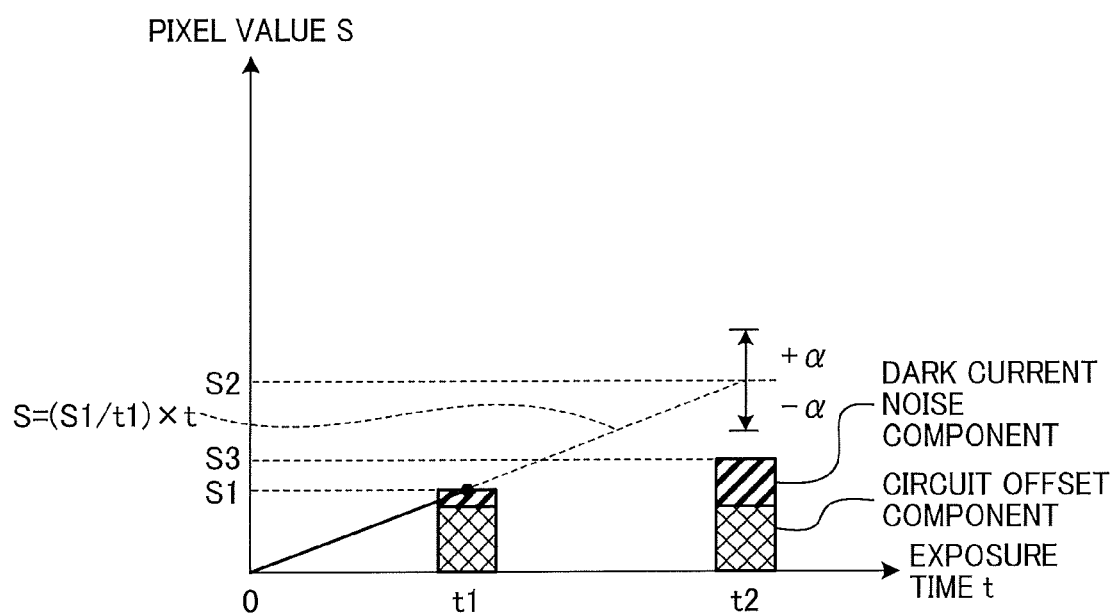

Each of FIGS. 9A and 9B is a graph of pixel values of the white-spot pixel 301 used to image the same subject with different exposure times t1 and t2 (t2>t1). FIG. 9A represents pixel values obtained with exposure of the white-spot pixel 301 to light. FIG. 9B represents pixel values obtained without any exposure of the white-spot pixel 301 to light (in dark time).

In the case of the white-spot pixel 301 as illustrated in FIG. 9A, the dark-current noise component increases with the exposure time. However, the dark-current noise component is smaller than the signal component of incident light. As a result, the pixel value S3 of the white-spot pixel 301 falls within the margin of ±α of the pixel value S2. Accordingly, the white-spot pixel 301 is erroneously determined as the normal pixel, which is disadvantageous.

In the pixel value of the white-spot pixel 301 in the dark time (without any exposure of the white-spot pixel 301 to light) as illustrated in FIG. 9B, the circuit offset component is greater than the dark-current noise component. Due to this aspect, even the normal pixel fails to fall within the margin of ±α of the pixel value S2 as the result of the determination of defective pixel based on the pixel value S2, assuming that the pixel value S of 0 is obtained with the exposure time t of 0 and the pixel value S linearly changes with time. Thus, the normal pixel is erroneously determined as a defective pixel, which is disadvantageous. Hence, the defective pixel detection method according to the comparative example has difficulties in detecting the white-spot pixel 301 while achieving the detection of the black-spot pixel 302.

Configuration and Operation of MFP According to an Embodiment

Figure 10:
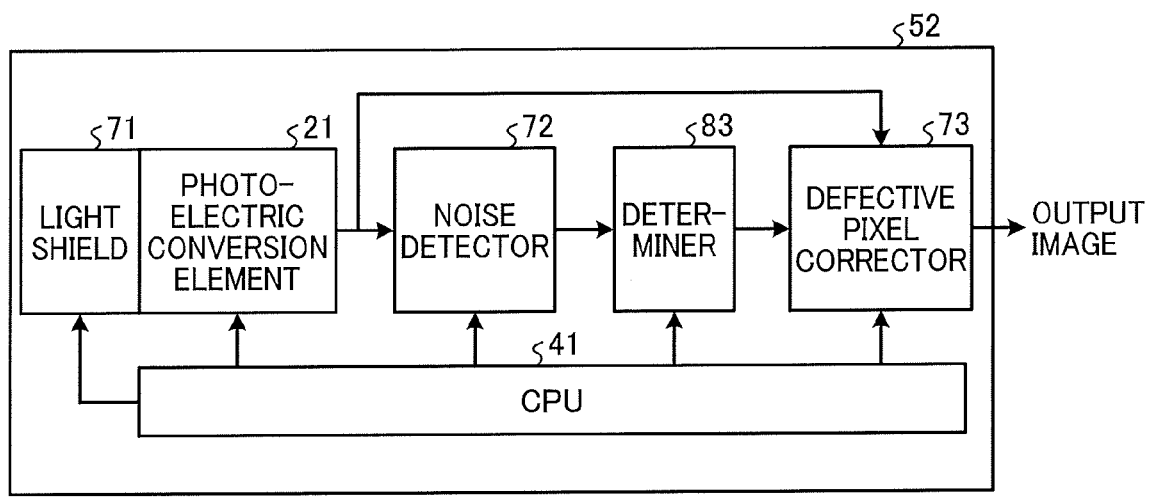
FIG. 10 is a block diagram of an image reader mounted on the MFP according to an embodiment of the present disclosure.

In the MFP according to an embodiment of the present disclosure, the image reader 52 has a configuration as illustrated in FIG. 10. More specifically, the image reader 52 of the MFP according to an embodiment of the present disclosure includes a light shield 71, a noise detector 72, a determiner 83, and a defective-pixel corrector 73. The light shield 71 shields the photoelectric conversion element 21 from light. The noise detector 72 and the determiner 83 detect a defective pixel. The defective-pixel corrector 73 corrects the defective pixel detected by the noise detector 72 and the determiner 83.

The light shield 71 is configured as, e.g., a light-shielding device that includes a light-non-transmissive light-shielding member covering the light-receiving surface of the photoelectric conversion element 21, to prevent light from entering the photoelectric conversion element 21. Alternatively, in some embodiments, the ADF 3, a pressure plate, or the reference white plate 23 is used for light shielding.

The CPU 41 controls the light shield 71 to cover the photoelectric conversion element 21 with the light-shielding member in correcting a defective pixel. The photoelectric conversion element 21 obtains pixel data regarding the above-described accumulation times t1 and t2 (t2>t1) in the dark time (when the photoelectric conversion element 21 is not exposed to light to prevent light from entering the photoelectric conversion element 21) in which the photoelectric conversion element 21 is covered with the light-shielding member.

The noise detector 72 and the determiner 83 detect a defective pixel based on the pixel data supplied from the photoelectric conversion element 21. The defective-pixel corrector 73 performs predetermined correction processing on pixel data of defective pixels, out of the pixel data supplied from the photoelectric conversion element 21, based on the detection result of the defective pixel detected by the noise detector 72 and the determiner 83. Subsequently, the detective-pixel corrector 73 outputs the corrected image data to an external device, such as a monitor or a storage device.

In the following description, the noise detector 72, the determiner 83 and the defective-pixel corrector 73 are implemented by hardware such as ASIC. Alternatively, in some embodiments, any one or any combination, or all of the noise detector 72, the determiner 83, and the defective-pixel corrector 73 are implemented by software. In such a case, the CPU 41 reads a defective-pixel correction program stored in, e.g., the HDD 44 or the flash memory 45 illustrated in FIG. 3, and operates as the noise detector 72, the determiner 83, and the defective-pixel corrector 73 according to the program deployed in the RAM 43. Thus, the CPU 41 performs the defective-pixel detection processing and the defective-pixel correction processing as described below.

Configuration and Operation of Noise Detector and Determiner

Figure 11:
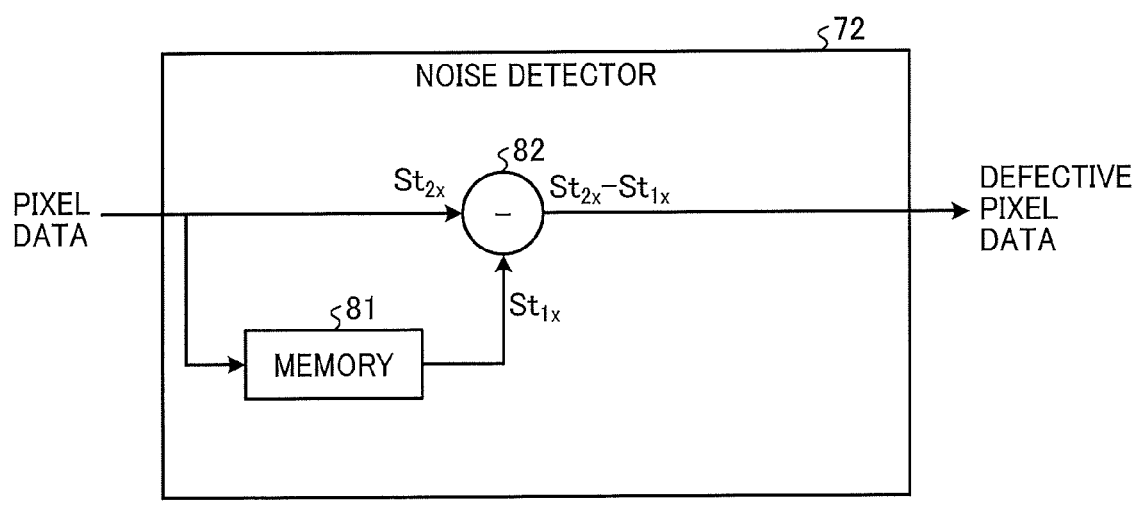
FIG. 11 is a block diagram of a noise detector mounted in the image reader of FIG. 10.

FIG. 11 is a block diagram of the noise detector 72. As illustrated in FIG. 11, the noise detector 72 and the determiner 83 include a memory 81 and a subtracter 82, which are involved in detecting a defective pixel. The memory 81 stores a pixel value St1x corresponding to the accumulation time t1 (a first time) of electric charge in the dark time. The subtracter 82 obtains a subtraction between the pixel value St1x stored in the memory 81 and a pixel value St2x corresponding to the accumulation time t2 (a second time) in the dark time (t2>t1).

Note that, the configuration that obtains a subtraction between the pixel value St1x and the pixel value St2x is not limited to the configuration that employs the subtracter 82. Thus, alternatively, in some embodiments, a configuration that includes a multiplier to reverse the pixel value St1x to a negative value and an adder to add the multiplication result to the pixel value St2x is applicable to obtain the same result. Further, in some embodiments, the RAM 43 or the flash memory 45 illustrated in FIG. 3, which is disposed outside the noise detector 72, is used as the memory 81.

In the MFP according to at least one embodiment for example, the photoelectric conversion element 21 is disposed for each color of the RGB (red, green, blue) or YMC (yellow, magenta, cyan). In such a configuration, the noise detector 72 receives each image data (each pixel value) of the RGM from the photoelectric conversion elements 21 for the respective colors. The noise detector 72 stores, in the memory 81, the pixel values St1x obtained at the accumulation time t1 for all the pixels of the photoelectric conversion element 21 for each color in the dark time for detecting noise.

In such a case, the pixel value St1x corresponding to the accumulation time t1 is stored in the memory 81. However, no limitation is not intended herein. Alternatively, in some embodiments, the memory 81 stores therein the pixel value St2x corresponding to the accumulation time t2 that is longer than the accumulation time t1 for each color.

When the subtractor 82 receives the pixel values St2x corresponding to the accumulation time t2 longer than the accumulation time t1 for each color, the CPU 41 reads the pixel value St1x at a pixel position corresponding to the pixel position of each pixel value St2x from the memory 81, subsequently supplying the read pixel value St1x to the subtractor 82. Subsequently, the subtractor 82 calculates a subtraction value St2x−St1x for each color.

The determiner 83 compares the subtraction value St2x−St1x of each pixel with a predetermined threshold value Dth, and determines whether the pixel is a defective pixel. When the subtraction value St2x−St1x is greater than or equal to the threshold value Dth, the determiner 83 determines the pixel as the defective pixel. When any one of the pixel values for the colors at a common pixel position is greater than or equal to the threshold value Dth, the determiner 83 determines that the pixels for the colors at a common pixel position are all defective pixels (first determination processing). Note that, the threshold value Dth is a fixed value or any desired value for a user.

Figure 12A:
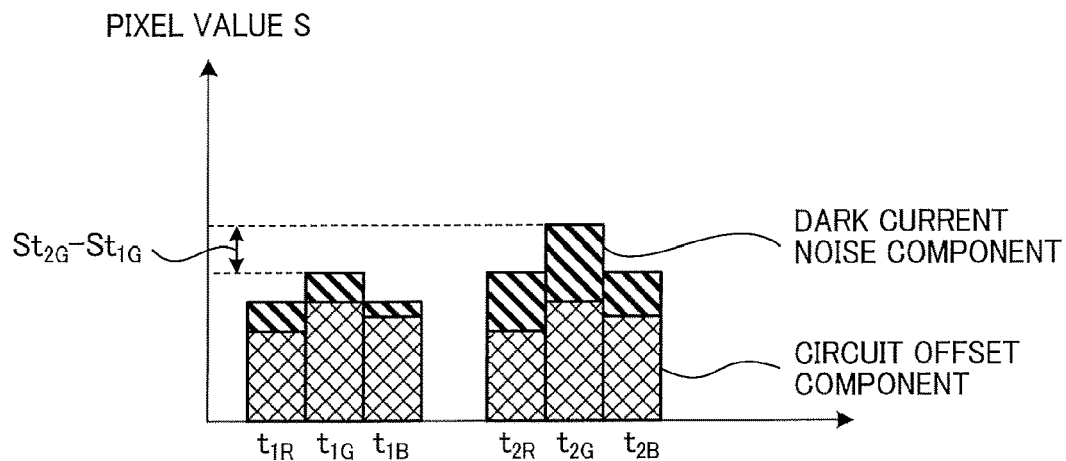
FIGS. 12A, 12B, and 12C each is a graph of pixel values from which circuit offset components have been removed by the noise detector mounted in the MFP according to an embodiment of the present disclosure.

A detailed description is given of the defective-pixel determination processing. FIG. 12A is a graph of pixel values of the normal pixel for each color at the accumulation time t1 and the accumulation time t2. More specifically, in FIG. 12A, each pixel value of accumulation times t1R, t1G, and t1B denotes a pixel value of the normal pixel of each color at the accumulation time t1. Each pixel value of accumulation times t2R, t2G, and t2B denotes a pixel value of the normal pixel of each color at the accumulation time t2. When each pixel value of the accumulation times t1R, t1G, t1B is subtracted from each pixel vale of the accumulation times t2R, t2G, t2B, the circuit offset component, which is a substantially fixed value irrespective of the accumulation time, is removed from the pixel value, thus obtaining a pixel value that is a value of the dark-current noise component for each color. In the case of the normal pixel, each pixel value representing a value of the dark-current noise component for each color is less than the threshold value Dth as illustrated in FIG. 12C. In this case, the determiner 83 determines each pixel of the colors as the normal pixel.

Figure 12B:
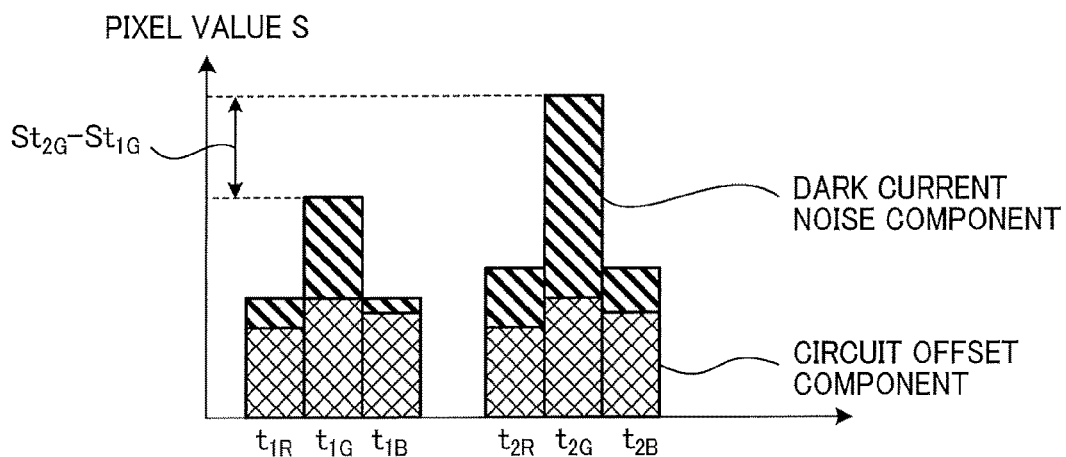
Figure 12C:
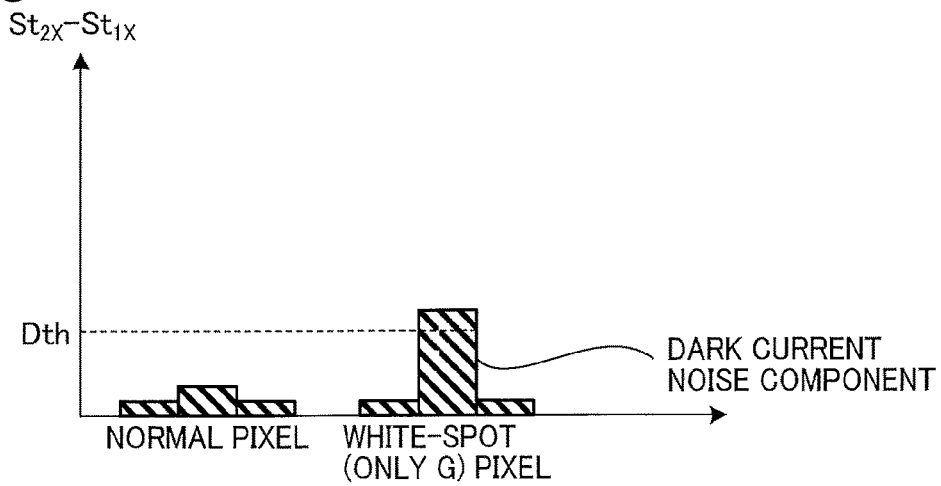

FIG. 12B is a graph of a pixel value of the normal pixel for each color at the accumulation time t1 and the accumulation time t2. More specifically, in FIG. 12A, each pixel value of accumulation times t1R, t1G, and t1B denotes a pixel value of the defective pixel of each color at the accumulation time t1. Each pixel value of accumulation times t2R, t2G, and t2B denotes a pixel value of the normal pixel of each color at the accumulation time t2. As describe above, when each pixel value of the accumulation times t1R, t1G, t1B is subtracted from each pixel value of the accumulation times t2R, t2G, t2B, the circuit offset component, which is a substantially fixed value irrespective of the accumulation time, is removed from the pixel value, thus obtaining a pixel value that is a value of the dark-current noise component for each color.

In the case of the white-spot pixel, however, the dark-current noise component is at high level even in the dark time without exposure to light as in the pixel value corresponding to the accumulation time t2G of FIG. 12B. In the example of FIG. 12B, the pixel for green (G) is the white-spot pixel. Accordingly, from the values of the dark-current noise component obtained by subtracting the pixel values of the accumulation times t1R, t1G, t1B from the pixel values of the accumulation times t2R, t2G, t2B, a pixel having the dark-current noise component with a value greater than or equal to the threshold value Dth is detected for each color as illustrated in FIG. 12C.

In this case, the determiner 83 determines that such a pixel for a color having the dark-current noise component with a value greater than or equal to the threshold value Dth is a defective pixel. At the same time, the determiner 83 determines that the pixels for the other colors at the same pixel position as that of the above-described pixel determined as the defective pixel are defective pixels as well. In other words, the determiner 83, which has determined any one of the pixels for the colors at the common pixel position as a defective pixel, determines that the pixels for the colors at the common pixel position are all defective pixels.

The photoelectric conversion element 21 increases in temperature with heat generated by the drive operation. With an increase in time after the start of driving of the photoelectric conversion element 21, the photoelectric conversion element 21 increases in temperature. With an increase in temperature of the photoelectric conversion element 21, the dark-current noise component increases. Accordingly, the white-spot pixel is accurately detected by determining the white-spot pixel based on the subtraction St2x−St1x between the pixel value St1x for the accumulation time t1 and the pixel value St2x for the accumulation time t2 longer than the accumulation time t1.

Second Determination Processing

In the above description, the determiner 83 determines that each pixel for the colors is the normal pixel when the pixel values of the pixels at the same pixel position for the colors are all less than the threshold value Dth. In some embodiments, the determiner 83 further performs second determination processing described below.

More specifically, when the pixel values of the pixels at the common pixel position for the colors are all less than the threshold value Dth, the determiner 83 multiplies all of the pixel values at the common pixel position for the colors and determines whether the multiplied value is greater than or equal to a predetermined threshold value Dth2 before determining the pixels as the normal pixels. When the multiplied value of the pixel values for the colors is greater than or equal to the predetermined threshold value Dth2, the determiner 83 determines that the pixels at the same pixel position for the colors are all defective pixels (the second determination processing).

In some embodiments, the determiner 83 performs only the first determination processing to determine defective pixels. Alternatively, in some embodiments, the determiner 83 performs both the first determination processing and the second determination processing to thereby increase the accuracy of determination of the defective pixel.

Black Shading Correction Processing

Figure 13:
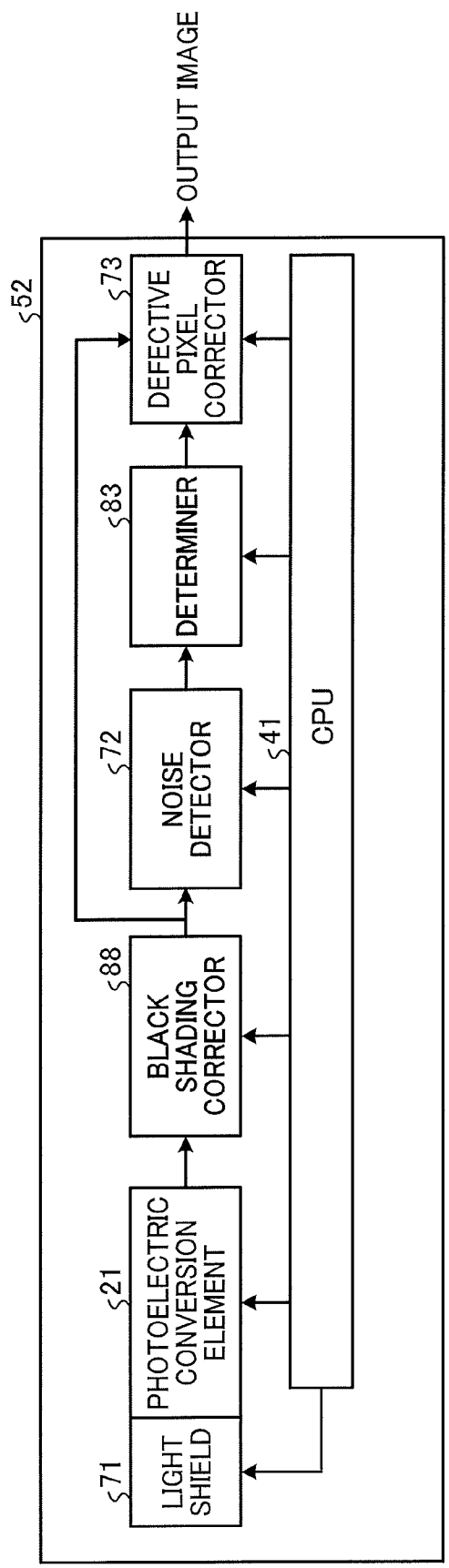
FIG. 13 is a block diagram of an image reader including a black shading corrector in the MFP according to an embodiment of the present disclosure.

In some embodiments, the image reader 52 further includes a black shading corrector 88 as illustrated in FIG. 13. In such a case, the black shading corrector 88 is disposed between the photoelectric conversion element 21 and the noise detector 72. The black shading corrector 88 is implemented by hardware or software.

The black shading corrector 88 obtains pixel values of all the pixels in the dark time from the photoelectric conversion element 21. The black shading corrector 88 stores the obtained pixel values in the dark time (without any exposure of the photoelectric conversion element 21 to light) in a storage unit disposed inside or outside the black shading corrector 88. Subsequently, the black shading corrector 88 subtracts each pixel value in the dark time stored in the storage unit, from each pixel value in the light time that is image data obtained by illuminating the photoelectric conversion element 21 to read, e.g., a document.

This configuration removes the circuit offset component that is a fixed pattern noise (FPN) from the imaging data, and further increases a signal-to-noise ratio (S/N) of the imaging data.

Each pixel value in the dark time that is stored in the storage unit for the black shading correction is used for the above-described white-spot pixel determination processing of the noise detector 72 at a subsequent stage. With such a configuration that includes the black shading corrector 88 in the image reader 52, the memory 81 for the noise detection is omitted. In other words, the storage unit for the black shading correction and the memory 81 for the noise detection are used in combination, thereby reducing the number of components, thus allowing the simplification of the configuration.

Operation of Storing Determination Result

Figure 14A:
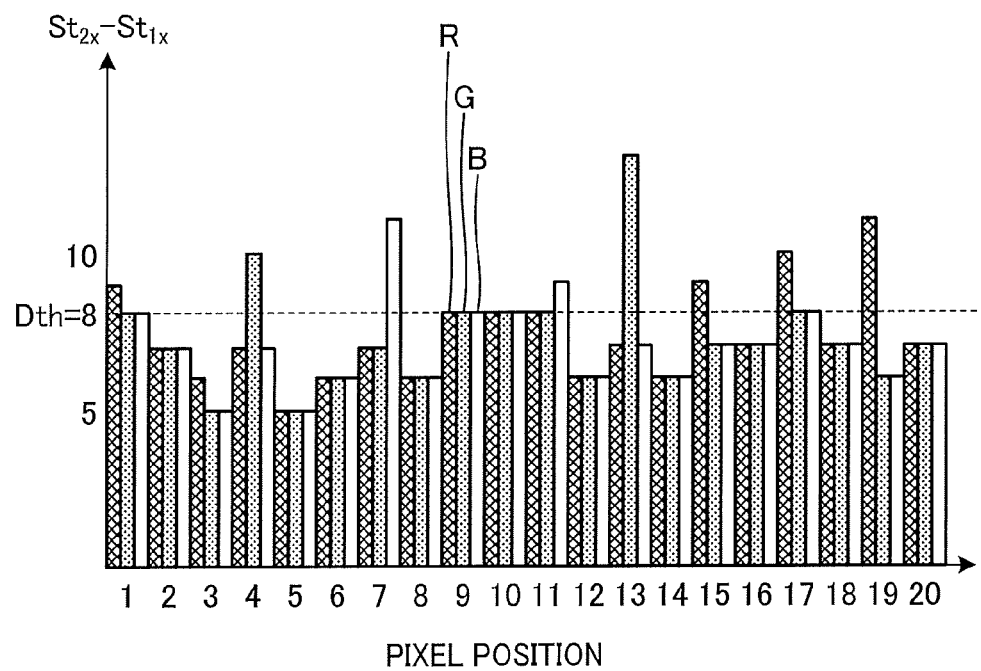
FIGS. 14A and 14B each is a graph of an example of a defective pixel detected by the noise detector and a determiner mounted on the MFP according to an embodiment of the present disclosure.
Figure 14B:
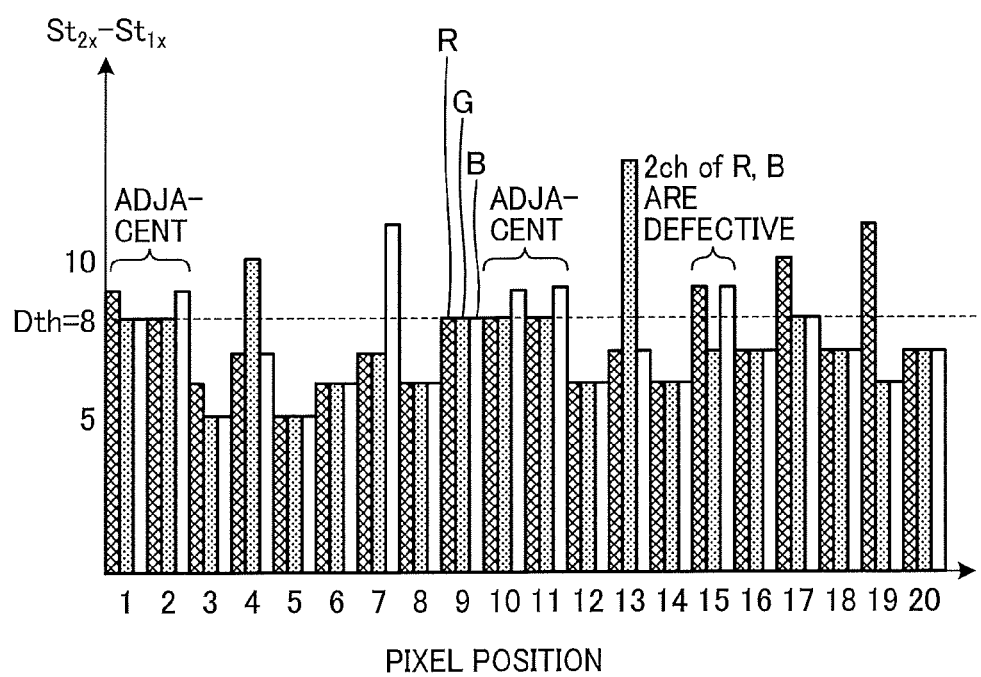

Next, a description is given of an operation of storing the determination results from the determiner 83. Each of FIGS. 14A and 14B is a histogram of the determination result of defective pixel when the photoelectric conversion element 21 as, e.g., a linear sensor for each of the RGB has 20 pixels. FIG. 14A is a histogram of the (N−1)th determination result. FIG. 14B is a histogram of the Nth determination result. The symbol "N" denotes a natural number of two or more. In FIGS. 14A and 14B, a bar indicated by oblique lines represents a pixel of red (R), a bar indicated by dotted lines represents a pixel of green (G), and a white bar represents a pixel of blue (B).

In the examples of FIGS. 14A and 14B, a pixel having a pixel value of greater than or equal to the first threshold value, e.g., 8, is determined as the defective pixel. More specifically, as illustrated in FIGS. 14A and 14B, the first pixel of red has a pixel value (the pixel value St2x of the accumulation time t2—the pixel value St1x of the accumulation time t1 as described above) of greater than or equal to the first threshold value Dth. In this case, the determiner 83 determines each of the first pixels of RGB as the defective pixel. The determiner 83 determines all of the three pixels of RGB as the defective pixel upon determining any one of the pixels of RGB as a defective pixel. This configuration enables accurately performing the defective-pixel correction processing. Similarly, the fourth pixel of green has a pixel value (the pixel value St2x of the accumulation time t2—the pixel value St1x of the accumulation time t1 as described above) of greater than or equal to the first threshold value Dth. Accordingly, the determiner 83 determines each of the fourth pixels of RGB as the defective pixel.

The determiner 83 stores determination data for, e.g., six pixels out of determination data regarding the determination results of each pixel, in the RAM 43 or the HDD 44 in FIG. 3, or the memory 61 in FIG. 11, for example. FIGS. 15A through 15B are tables of the determination data stored in a desired storage unit. FIG. 15A is a table of the (N−1)th determination result. FIGS. 15B through 15D are tables of Nth determination results, respectively. The symbol "N" denotes a natural number of two or more.

As illustrated in FIG. 15A, the determiner 83 stores, in the any desired storage unit, the determination data including the rank (priority order), pixel position, noise amount of each pixel of RGB, and maximum value of the noise amount of each pixel of RGB. In the example of FIG. 15A, the determination data for the pixels are stored in order of descending noise amount. More specifically, in the example of FIG. 15A, the pixels at the pixel positions of 13, 7, 19, 4, 17, and 11 are listed in order of descending noise amount. For the pixel, which is ranked as 1 (Rank 1) and the pixel position of which is 13, the noise amounts for red, green, blue are 7, 13, and 7, respectively. Among these noise amounts, the noise amount of 13 is the largest. Similarly, for the pixel, which is ranked as 3 (Rank 3) and the pixel position of which is 19, the noise amounts of red, green, and blue are 11, 6, and 6, respectively. Among these noise amounts, the noise amount of 11 is the largest.

FIG. 15B represents determination data as the Nth determination result, in which the pixels are listed in order of descending noise amount. The determination data in FIG. 15B is obtained by the determiner 83 performing the determination processing again after obtaining the determination data in FIG. 15A. The determiner 83 stores, for example, six pieces of determination data at a maximum in the certain storage unit. The determiner 83 rewrites the determination data stored in the storage unit according to the determination data obtained later.

More specifically, in the example of FIG. 15B in which the noise amount is prioritized, the determination data corresponding to rank 6 is rewritten to be replaced by new determination data regarding, e.g., the pixel position of 10 at which the noise amounts of red, green, and blue are 8, 8, and 9, which is clear by comparing with FIG. 15A.

The noise amounts of red, green, and blue in rank 6 are 8, 8, and 9 in FIG. 15A. In FIG. 15B, the noise amounts of red, green, and blue at the pixel position of 10, which has been newly obtained and is to be substituted for the determination data for rank 6, are 8, 8, and 9 same as the determination data at the pixel position of 11.

In the MFP, the user often places an imaging target such as a document in the center of a document tray. Accordingly, when there is no difference in noise amount between pixels, the determiner 83 selects the determination data regarding the pixel position closer to the center of the photoelectric conversion element 21 than the other pixel positions and stores (replaces the stored data by) the selected determination data in the desired storage unit. This scenario enables storing more effective determination data in a desired storage unit to be used for the defective pixel correction processing.

In the above-described example, the determination data is stored in order of descending noise amount. When defective pixels, such as the pixel at the pixel position of 1 and the pixel at the pixel position of 2, are adjacent to each other as illustrated in FIG. 14B, image quality significantly decreases. As illustrated in FIG. 15C, the determiner 83 ranks the determination data of the adjacent defective pixels, and stores the result in the storage unit. In the example of FIG. 15C, the determination data of the adjacent pixels at pixel positions 10 and 11 and the determination data of the adjacent pixels at pixel position 2 and 1 are preferentially stored in the storage unit.

Even with a lower noise level, when a plurality of color channels includes defective pixels, image quality significantly decreases. Accordingly, the determiner 83 ranks the determination data in which the plurality of color channels includes defective pixels, and stores the data in the storage unit as illustrated in FIG. 15D. In the example of FIG. 15D, the determination data of pixels at pixel positions of 15, 13, 7, 19, 4, and 17 is preferentially stored as the pixels for each of which a plurality of color channels is a defective pixel.

Note that, the determiner 83 ranks the pixels in view of all of the defective pixels with large noise amounts, adjacent defective pixels, and the defective pixels of a plurality of color channels.

Detection Processing Operation of Defective Pixel in Starting Up

Figure 16:
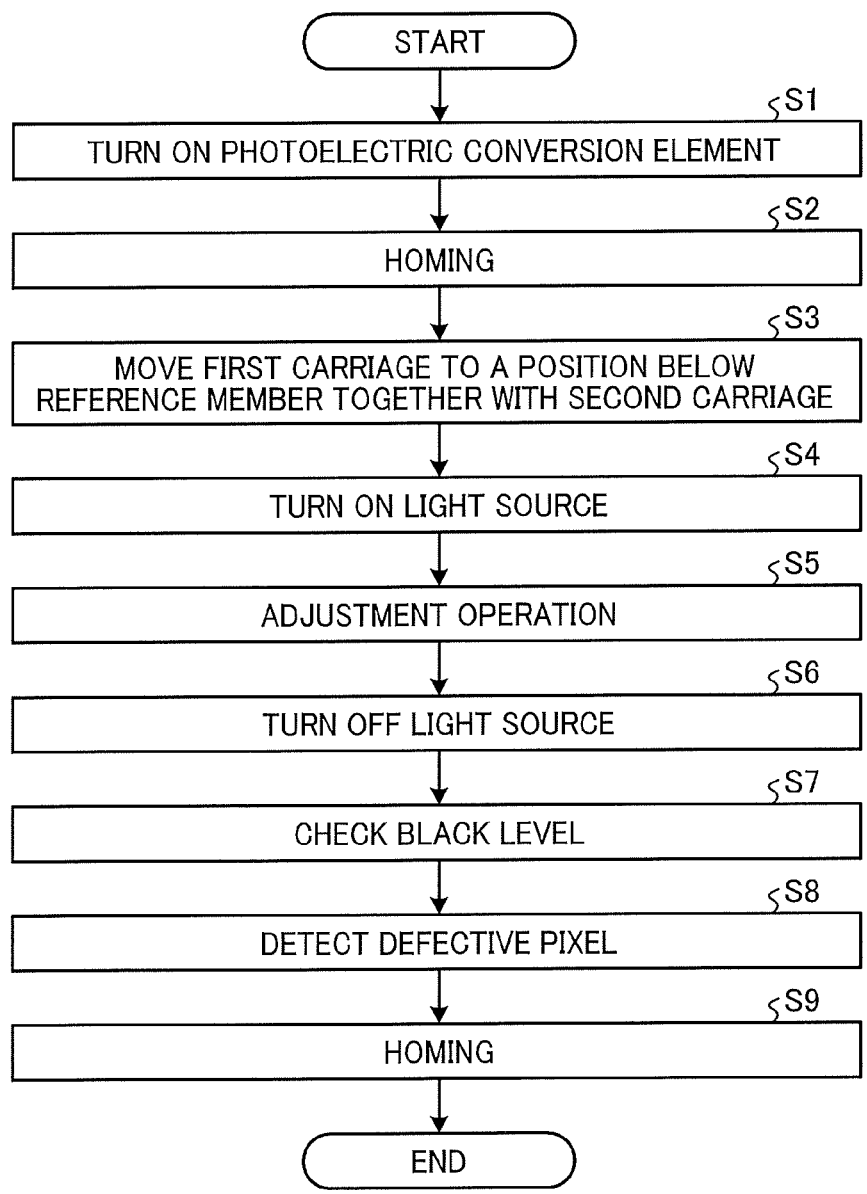
FIG. 16 is a flowchart of defective-pixel detection processing, for explaining a timing of detecting a defective pixel in starting up the MFP according to an embodiment of the present disclosure.

Next, the MFP according to an embodiment is configured to detect a defective pixel in starting up. FIG. 16 is a flowchart of an operation of detecting a defective pixel in the process of starting up the MFP. When the main power source of the MFP is turned on, the CPU 41 of FIG. 3 applies a drive voltage to the photoelectric conversion element 21 for warm up of the photoelectric conversion element 21 (step S1).

Each of the first carriage 18 and the second carriage 24 in FIG. 2 has a standby position that is set during, e.g., conveyance and reading of a document. With such a configuration, the CPU 41 performs a homing control to move the first carriage 18 and the second carriage 24 to the standby mode (step S2) after applying the drive voltage to the photoelectric conversion element 21. The first carriage 18 and the second carriage 24 stand by for readout, at the standby position during, which is an example of the standby for readout.

Subsequently, the CPU 41 moves the first carriage 18 to a position below the reference white board 23 for adjustment (step S3). To prevent letting light out of the MFP, the CPU 41 moves the first carriage 18 to a position below the reference white board 23, and subsequently drives the light source 16 to be turned on (step S4). Upon turning on the light source 16, the CPU 41 performs an adjustment operation of each component, e.g., adjust the light level of the light source 15 and the gain of the PGA 62 of FIG. 4 using the reference white board 23 (step S5). Subsequently, the CPU 41 controls to turn off the light source 16 (step S6).

The CPU 41 turns off the light source 16, and subsequently checks the presence of any abnormality in the black level (step S7). After checking the black level, the CPU 41 performs the above-described defective pixel detection processing (step S8).

Finally, the CPU 41 performs the above-mentioned homing control (step S9), and the process of starting up the MFP in FIG. 16 ends.

With an increase in temperature of the photoelectric conversion element 21, the accuracy of detection of defective pixels that changes with temperature increases. Considering such a theory, the CPU 41 performs the defective pixel detection processing around the end of the processing of starting up the MFP in FIG. 16. This enables high-accuracy detection of defective pixels. In step S8, of the two pixel values in the dark time for different accumulation times, one pixel value in the dark time for the longer accumulation time than the accumulation time of the other pixel value is obtained later than the other pixel value in the dark time for the shorter accumulation time does. This increases the difference in noise amount between the pixels, thus allowing an accurate detection of defective pixels.

When the first carriage 18 is positioned below the reference white board 23 or when the pressure plate (or the ADF 3) is closed and the light source 16 is turned off, the MFP (the photoelectric conversion element 21) obtains the data in the dark time (dark-time data). For this reason, the CPU 41 detects defective pixels during the process of starting up the MFP that involves controlling the first carriage 18 to move under the reference white board 23. This configuration enables detecting defective pixels irrespective of the open/closed state of the pressure plate (or the ADF). This configuration also eliminates the need for the homing control to move the first carriage 18 in each operation of detecting a defective pixel, thereby advantageously reducing the user's waiting time to wait until the MFP gets ready for reading a document.

When driven to be turned on or off, the light source 16 takes time to stabilize the output level. Accordingly, the number of turning on and off the light source 16 is preferably reduced. For this reason, the CPU 41 performs the defective pixel detection processing (step S8) together with the black level checking process (step S7) while the light source 16 is turned off, in the process of starting up the MFP. This configuration prevents an increase in the number of turning on and off light source 16 due to the defective pixel detection processing.

When the image reader 52 includes the shading corrector 88 as illustrated in FIG. 13, the defective pixel detector 72 obtains the above-described black-time pixel value used in the black shading correction processing, in step S8.

Figure 17:
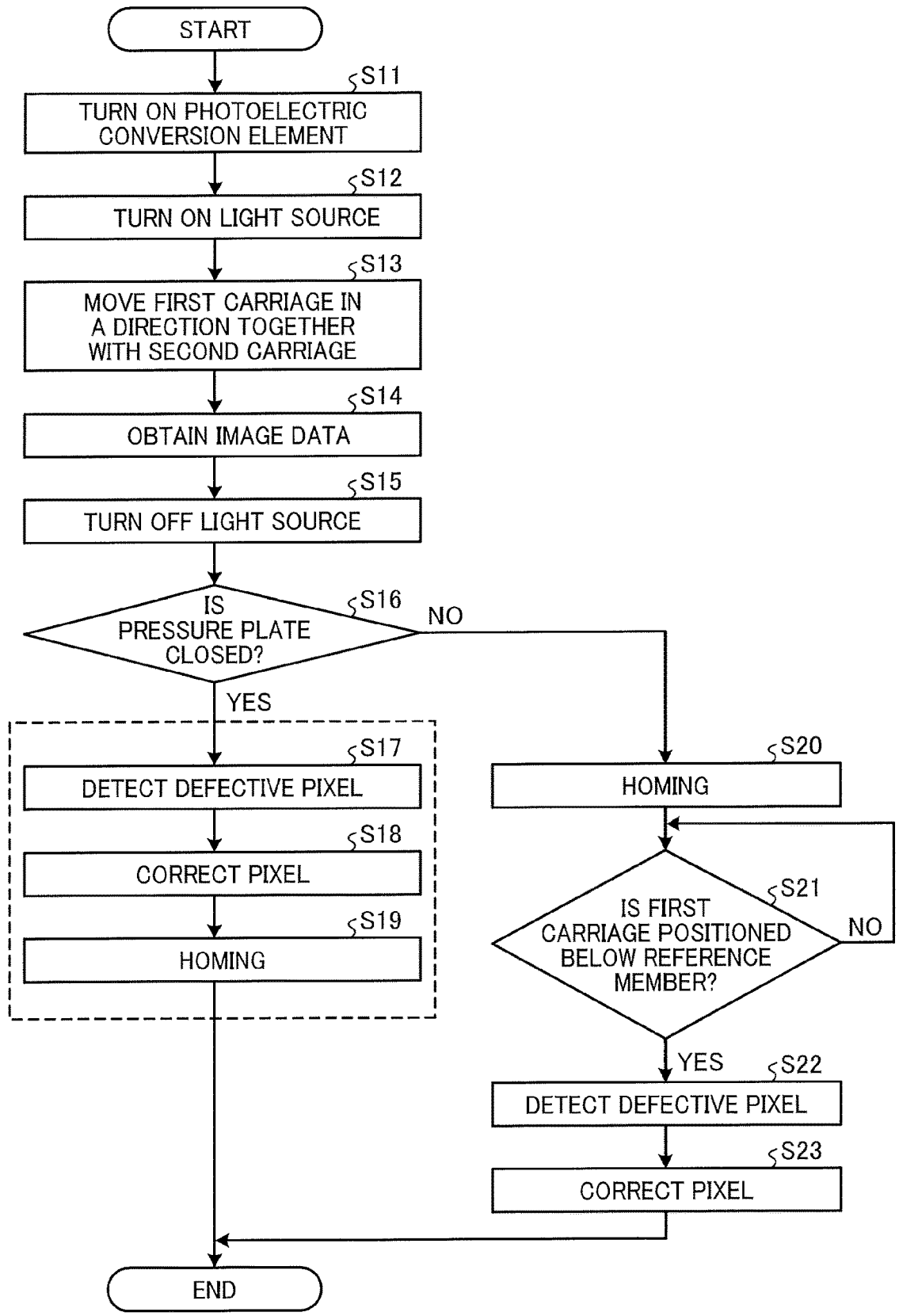
FIG. 17 is a flowchart of defective-pixel detection processing, for explaining a timing of detecting a defective pixel when reading a document by using a pressure plate in the MPF according to an embodiment of the present disclosure.

Operation of Detection of Defective Pixel in Reading Document with Pressure Plate FIG. 17 is a flowchart of the defective-pixel detection processing in reading a document with the use of a pressure plate. This defective-pixel detection processing is performed after obtaining image data and turning off the light source 16.

After reading a document by using the pressure plate, there is a timing at which the photoelectric conversion element 21 is shielded from external light with the pressure plate or the reference white board 23, which eliminates the need to prevent light from entering the photoelectric conversion element 21 in a separate manner. The photoelectric conversion element 21 has a higher temperature after obtaining image data than the time during the process of starting up the MFP illustrated in FIG. 16 does. This is because the photoelectric conversion element 21 has been driven for a long time to obtain image data. Thus, after obtaining image data, the defective-pixel detection processing with high accuracy is achieved.

In the flowchart of FIG. 17, the CPU 41 having started reading a document with a use of the pressure plate applies a drive voltage to the photoelectric conversion element 21 (turns on the photoelectric conversion element 21) (step S11), and turns on the light source 16 (step S12).

Subsequently, the CPU 41 moves the first carriage 18 in the direction A in FIG. 2 (step S13), and obtains image data of a document (step S14). The CPU 14 controls to turn off the light source 16 (step S15). Subsequently, the CPU 41 determines whether the pressure plate is closed (step S16).

When the pressure plate is closed (Yes in step S16), the CPU 41 performs the defective-pixel detection processing (step S17), and performs correction processing of defective pixels of the image data detected in step S14 (step S18). A specific example of the defect-pixel correction processing is described later. Then, the CPU 41 performs the above-described homing control in step S19, and ends the processing of the flowchart of FIG. 17.

When the pressure plate is not closed (No in step S16), the CPU 41 performs the above-described homing control in step S20. In step S21, the CPU 41 determines whether the first carriage 18 is positioned under the reference white board 23 after the above-described homing control.

When determining that the first carriage 18 is positioned under the reference white board 23 (Yes in step S21), the CPU 41 performs the above-described defective-pixel detection processing in step S22. Subsequently, the CPU 41 performs the defective-pixel correction processing on the image data detected in step S14 (step S23), and ends the processing of FIG. 17.

When the pressure plate is closed (Yes in step S16), the photoelectric conversion element 21 is shielded from light. Accordingly, the defective-pixel detection is allowed immediately after controlling to turn off the light source 16. At this time, the longer accumulation time is made longer than usual between two dark-time image data obtained with different accumulation times to be used for the defective-pixel detection. This increases the difference in noise amount between pixels, thereby enabling the detection of defective pixels with accuracy as described above.

In some embodiments, the CPU 41 performs the defective-pixel correction processing (step S18 and step S23) using an updated determination data of a defective pixel. For this reason, the defective-pixel correction process (step S18, step S23) is executed after the defective-pixel detection process (step S17, step S22). In some embodiments, the CPU 41 executes the defective-pixel correction processing immediately after the homing control (step S20).

Operation of Defective-Pixel Detection in Reading Document with ADF

Figure 18:
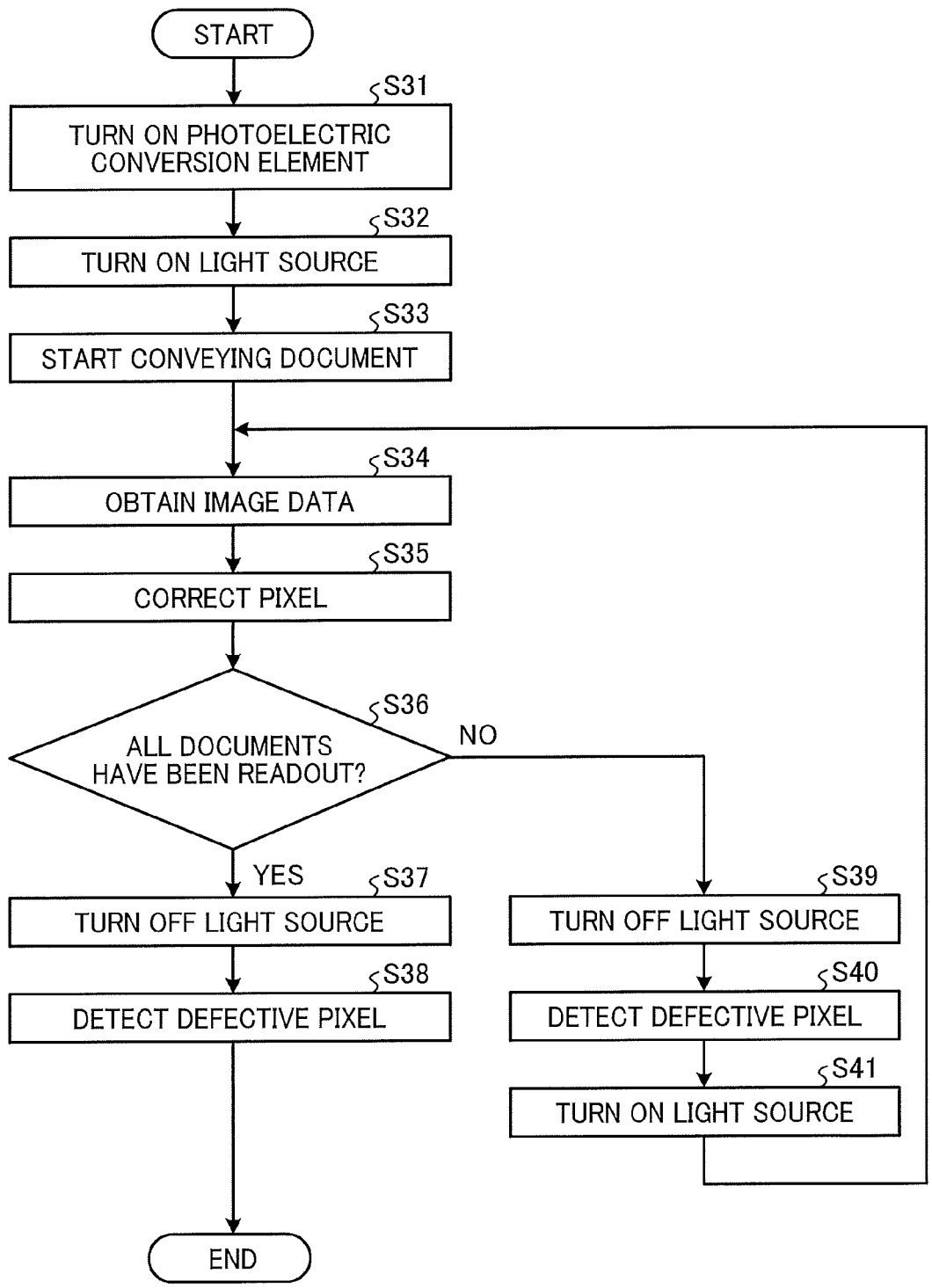
FIG. 18 is a flowchart of defective-pixel detection processing, for explaining a timing of detecting a defective pixel in reading a document by using an automatic document feeder (ADF) in the MPF according to an embodiment of the present disclosure.

FIG. 18 is a flowchart of the processing for detecting a defective pixel in reading a document with the ADF 3. In the flowchart of FIG. 18, the CPU 41 having started reading a document with the ADF 3 applies a drive voltage to the photoelectric conversion element 21 (turns on the photoelectric conversion element 21) (step S31), and turns on the light source 16 (step S32).

Subsequently, the CPU 41 starts conveyance control of the document set in the ADF 3 (step S33), and obtains image data of the document (step S34). Then, the CPU 41 executes the defective-pixel correction processing on the image data obtained in step S34 (step S35), using determination data of a defective pixel detected in starting up the MFP as illustrated in the flowchart of FIG. 16 or reading a document with the pressure plate as illustrated in the flowchart of FIG. 17.

Subsequently, the CPU 41 determines whether the reading of all the documents set in the ADF 3 are completed in step S36. When determining that all the documents have been read (Yes in step S36), the CPU 41 controls to turn off the light source 16 (step S37), and executes the defective-pixel detection processing (step S38), ending the processing of FIG. 18.

When a negative determination is made (No in step S36), the CPU 41 controls to turn off the light source 16, and performs the defective-pixel detection processing (step S40). That is, the CPU 41 executes the defective-pixel detection processing in a time interval between consecutive readings of documents, in consecutively reading documents with use of the ADF 3. This configuration enables updating determination data of defective pixels in real time. When the defective-pixel detection processing is completed, the CPU 41 turns on the light source 16, and the process returns to step S34.

In some embodiments, the CPU 41 executes the defective-pixel detection processing in step S40 for each set of a certain number of documents instead of for each document. This configuration handles the circumstances that the light source 16 takes time to stabilize the light output (intensity), and thereby the total reading time might increase.

Further, the ADF 3 is closed when the reading of a document is completed. For this reason, in some embodiments, the longer accumulation time is made longer than usual between two dark-time pixel values obtained with different accumulation times to be used for the defective-pixel detection in step S37, in the same manner as when reading a document with use of the pressure plate.

Correction Processing of Defective Pixel

Figure 19:
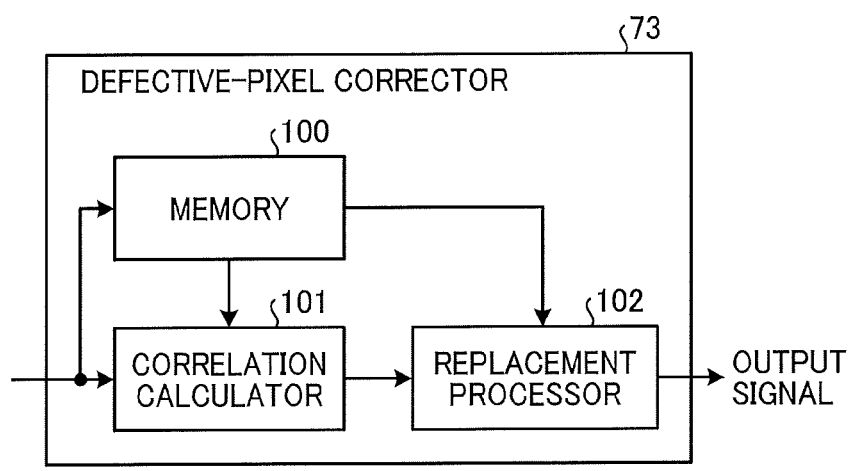
FIG. 19 is a block diagram of a defective-pixel corrector mounted on the MFP according to an embodiment of the present disclosure.

A description is given of the correction processing of defective pixels using determination data obtained as described above. FIG. 19 is a block diagram of the defective-pixel corrector 73 of the MFP 1. As illustrated in FIG. 19, the defective-pixel corrector 73 includes a memory 100, a correlation calculator 101, and a replacement processor 102.

Figure 20A:
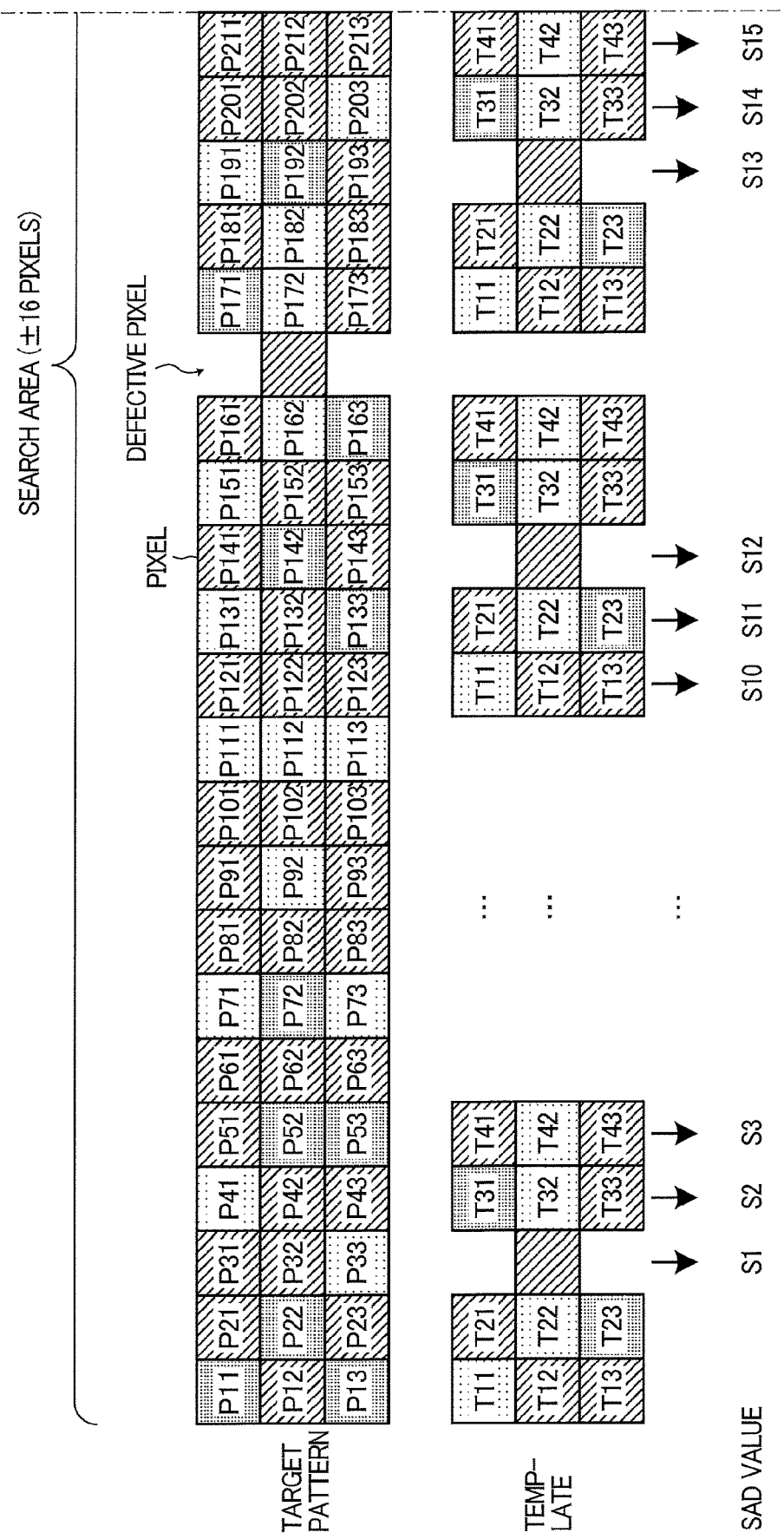
FIGS. 20A and 20B are illustrations of defective-pixel correction processing of the MFP according to an embodiment of the present disclosure.
Figure 20B:
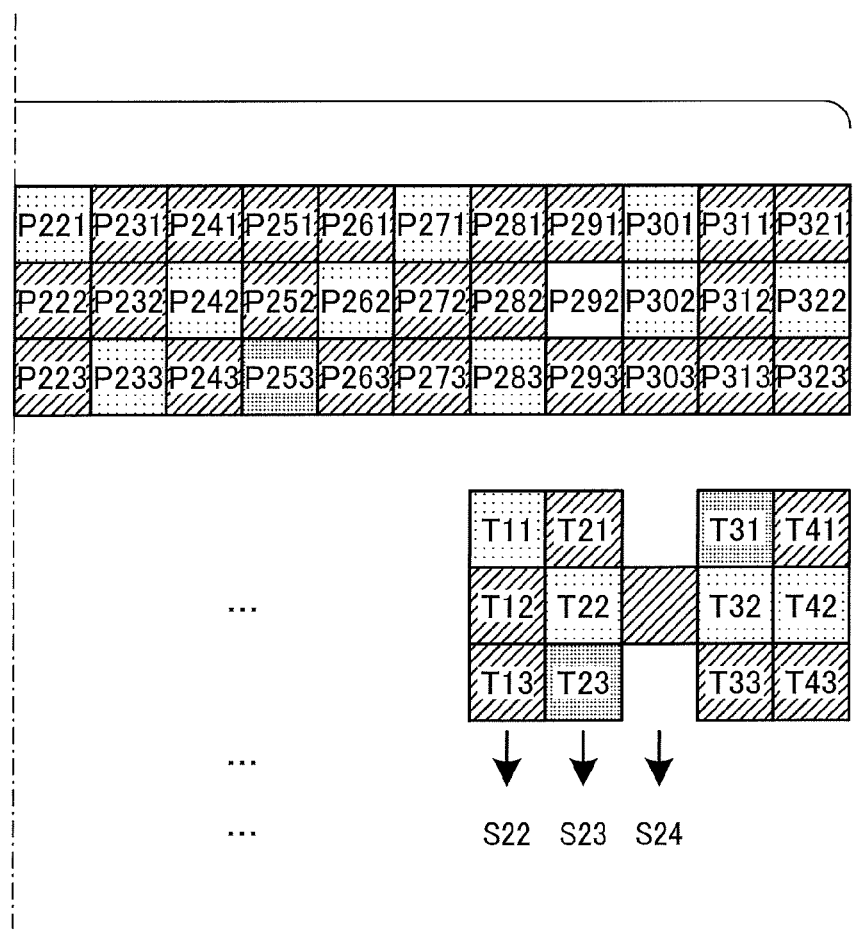

As illustrated in FIG. 20 for example, the defective pixel corrector 73 searches a search area (target pattern) to find a pixel to be interpolated (an interpolation candidate). The search area includes three rows, each row including 16 pixels on each side of a defective pixel in a pixel-arrangement direction of the photoelectric conversion element 21 (a direction in which pixels of the photoelectric conversion element 21 are arranged). In this case, the defective pixel has been determined as an interpolation target by the determining unit 83. The defective-pixel corrector 73 sets, as a template, an area that includes two pixels on both sides of a defective pixel in the pixel-arrangement direction of the photoelectric conversion element 21 for each of three rows. As illustrated in FIGS. 20A and 20B, the defective-pixel corrector 73 compares the template with the above-described target pattern (image data that includes 16 pixels on both sides of a defective pixel for each of three rows) to calculate a correlation degree between each part of the target pattern and the template by shifting the template pixel by pixel.

One example of the correlation degree is a sum of absolute difference (SAD) value. In the example of FIGS. 20A and 20B, the defective-pixel corrector 73 calculates 24 SAD values based on the equation below (to obtain SAD values S1 through S24 for example). The defective-pixel corrector 73 replaces the center pixel (as a replacement pixel) of the part of the target pattern, for which a minimum SAD value (maximum correlation degree) has been obtained, with the defective pixel.

Note that, the symbol "S" denotes the SAD value in the equation and FIGS. 20A and 20B. The symbol "S1" denotes the first SAD value, and the symbol "S24" denotes the 24th SAD value. The symbol "P" denotes the target pattern. The symbol "P11" denotes the first pixel in the first line (row) of the target pattern, and the symbol "P321" denotes the 32th pixel in the first line of the target pattern. Similarly, the symbol "P13" denotes the first pixel in the third line of the target pattern, and the symbol "P323" denotes the 32th pixel in the third line of the target pattern. The symbol "T" denotes a pixel of the template. The symbol "T11" denotes the first pixel in the first line of the template, and the symbol "T41" denotes the fourth pixel in the first line of the template. Similarly, the symbol "T13" denotes the first pixel in the third line of the template, and the symbol "T43" denotes the fourth pixel in the third line of the template.

$$S1=(P11-T11)+(P12-T12)+(P13-T13)+(P21-T21)+ \\ (P22-T22)+(P23-T23)+(P31-T31)+(P32-T32)+$$

(P33-T33) ... S24=(P281-T31)+(P282-T12)+ (P283-T13)+(P291-T21)+(P301-T31)+(P302-T32)+(P303-T33).

Figure 21:
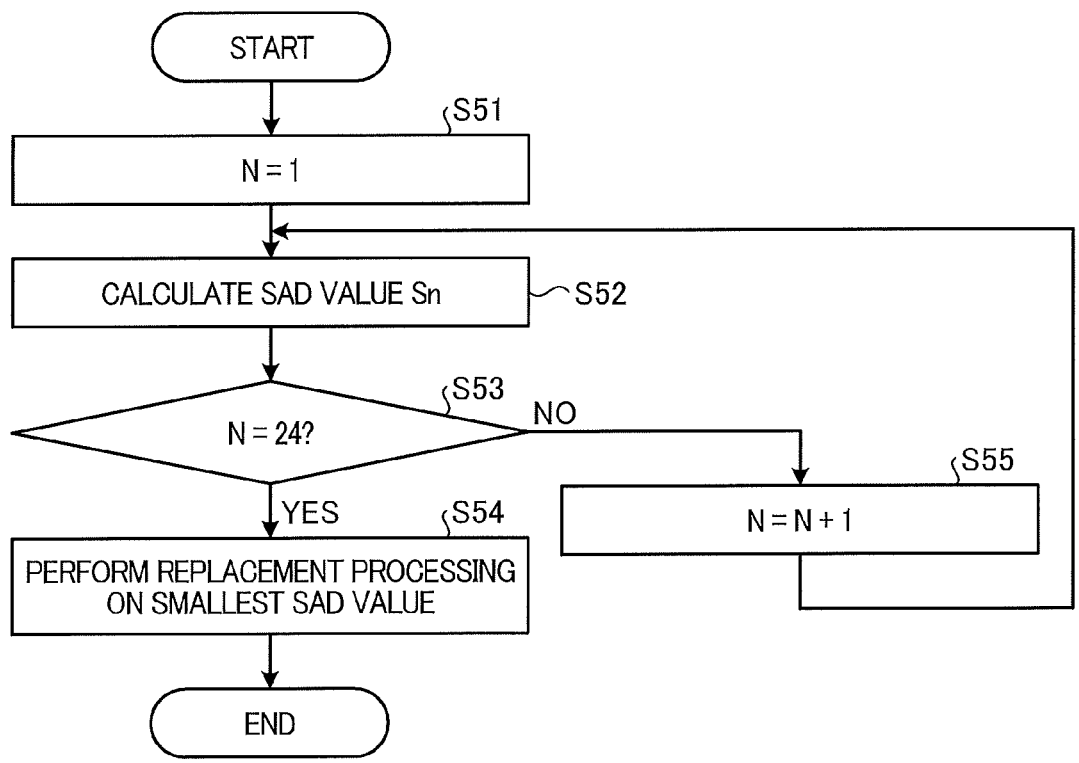
FIG. 21 is a flowchart of the defective-pixel correction processing of the MFP according to an embodiment of the present disclosure.

The defective-pixel corrector 73 obtains SAD values S1 through S24 by calculating the above-described equation. When SAD value 22 is minimum for example, the defective-pixel corrector 73 replaces the pixel P282 as the center pixel of the part of the target pattern, from which the minimum value has been calculated, with the defective pixel, FIG. 21 is a flowchart of the interpolation processing. In step S51, the correlation calculator 101 of FIG. 19 sets "1" as the number of calculation of the SAD value to a counter (n=1 where n is the number of calculation). In other words, the correlation calculator 101 calculates 24 SAD values in the example of FIGS. 20A and 20B. Accordingly, the correlation calculator 101 first sets "1" into the counter as the first operation for calculating a SAD value in step S51. Note that, the correlation calculator 101 increments the counter value by one for each completion of calculation of one SAD value such that the counter value increases from "1", "2", "3", ... to "24". The correlation calculator 101 increments the counter value at the timing when the defective-pixel corrector 73 shifts the template by one pixel with respect to the target pattern.

Subsequently, the correlation calculator 101 calculates a SAD value (Sn where S denotes a SAD value, and n denotes the ordinal number of 1st through 24th calculated SAD values), using the above-described equation in step S52. In step S53, the correlation calculator 101 determines whether the number of calculation is 24 (n is 24 where n denotes the number of calculation). As described above, the correlation calculator 101 performs the calculation while shifting the template pixel by pixel with respect to the target pattern. Accordingly, when the number of calculation is less than 24 (No in step S53), the process proceeds to step S55. In step S55, the correlation calculator 101 increments the number of calculation by one (n=n+1), and the process returns to step S52. In step S52, the correlation calculator 101 calculates a SAD value again.

When 24 SAD values are obtained (Yes in step S53), the process proceeds to step S54. In step S54, the replacement processor 102 replaces the center pixel of the part of the target pattern, of which the calculated SAD value is smallest among the 24 SAD values, as a replacement pixel with a defective pixel, i.e., performs the interpolating processing. Then, the processing of FIG. 21 ends.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments and variations may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A photoelectric conversion device, comprising:
 a photoelectric conversion element having a plurality of pixels to generate an image signal according to an intensity of light being input to the photoconversion element; and
 circuitry to
  obtain pixel values in dark time, respectively, for at least a first time interval and a second time interval, the second time interval being longer than the first time interval, the pixel values in dark time representing pixel values obtained when no light is input to the photoelectric conversion element,
  subtract the obtained pixel values for the first time interval from the obtained pixel values for the second time interval to obtain subtracted pixel values,
  detect a noise amount for each pixel of the plurality of pixels based on the subtracted pixel values, and
  determine a particular pixel as a defective pixel when the detected noise amount of the particular pixel is equal to or greater than a predetermined first threshold value.

2. The photoelectric conversion device according to claim 1, wherein the circuitry is further configured to
 correct a value of the defective pixel to a value of a normal pixel, among pixel values of the plurality of pixels of the photoelectric conversion element, and
 output the corrected pixel value to a subsequent device.

3. The photoelectric conversion device according to claim 2,
 wherein the circuitry is further configured to correct the value of the defective pixel when the photoelectric conversion element is in standby for a readout.

4. The photoelectric conversion device according to claim 2, wherein the circuitry is further configured to
 calculate a correlation degree between a target pattern and a template with a size of a part of the target pattern, while shifting the template on the target pattern at least pixel by pixel from an edge of the target pattern in a direction in which the pixels are arranged, the target pattern including one pixel row including the defective pixel and one or more pixel rows on each side of the one pixel row; and
 interpolate the defective pixel with a replacement pixel, the replacement pixel being a center pixel at a center of the part of the target pattern having a maximum correlation degree.

5. The photoelectric conversion device according to claim 1, further comprising a light shield to shield the photoelectric conversion element from light.

6. The photoelectric conversion device according to claim 1,
 wherein the photoelectric conversion element includes photoelectric conversion elements for a predetermined number of colors, and each of the photoelectric conversion elements includes pixels, and
 wherein, when having determined that one pixel of the pixels of the photoelectric conversion element for at least one of the colors is defective, the circuitry is further configured to determine that a corresponding pixel at a pixel position that is common to a pixel position of the one pixel determined as defective is defective for the other colors.

7. The photoelectric conversion device according to claim 6,
wherein, when each pixel at a common pixel position of each of the photoelectric conversion elements for the colors has a pixel value less than the first threshold value, the circuitry is further configured to
calculate an integrated value of the pixel values of the pixels at the common pixel positions of the photoelectric conversion elements for each of the colors, and
determine that, when the integrated value is a second threshold value or more, each pixel at the common pixel position of each of the photoelectric conversion elements for the colors is defective.

8. The photoelectric conversion device according to claim 1, further comprising a memory to store each pixel value in the dark time,
wherein the circuitry is further configured to subtract each pixel value in the dark time stored in the memory, from each pixel value obtained when light enters the photoelectric conversion element in capturing an image, so as to perform shading correction processing on each pixel value in capturing an image, and
wherein the circuitry is further configured to detect the noise amount for each pixel using each pixel value in the dark time stored in the memory as each pixel value corresponding to one of the first time interval and the second time interval in the dark time.

9. The photoelectric conversion device according to claim 1, further comprising a memory,
wherein the circuitry is configured to store, in the memory, determination data regarding the defective pixel according to a priority order, while rewriting each piece of the determination data stored in the memory according to the priority order.

10. The photoelectric conversion device according to claim 9, wherein the circuitry is further configured to store, in the memory, the determination data regarding the defective pixel in order of descending noise amount.

11. The photoelectric conversion device according to claim 9,
wherein the circuitry is further configured to store, in the memory, determination data regarding adjacent defective pixels in a decreasing order.

12. The photoelectric conversion device according to claim 10,
wherein the photoelectric conversion element includes photoelectric conversion elements for a predetermined number of colors, and each of the photoelectric conversion elements is a color channel that includes a set of a predetermined numbers of pixels for each color, and
wherein the circuitry is further configured to store, in the memory, the determination data of a defective pixel at a pixel position, at which more color channels have defective pixels than at other pixel positions other than the pixel position, in a descending order.

13. The photoelectric conversion device according to claim 1,
wherein the circuitry is further configured to determine the defective pixel at least one of: (1) at a time after a device to which the photoelectric conversion device is applied starts up, and (2) at a time when a reading operation of the photoelectric conversion element is completed.

14. The photoelectric conversion device according to claim 1,
wherein the circuitry is further configured to determine the defective pixel each time when one reading operation of the photoelectric conversion element is completed or a plurality of reading operations of the photoelectric conversion element is completed.

15. The photoelectric conversion device according to claim 1,
wherein the circuitry is further configured to obtain a pixel value in the dark time for the second time interval, later than a time at which the pixel value in the dark time for the first time interval is obtained, to detect the noise amount.

16. A method of determining a defective pixel, the method comprising:
obtaining pixel values in dark time, respectively, for at least a first time interval and a second time interval, the second time interval being longer than the first time interval, the pixel values in dark time representing pixel values obtained when no light is input to a photoelectric conversion element having a plurality of pixels and that generates an image signal according to an intensity of light being input;
subtract the obtained pixel values for the first time interval from the obtained pixel values for the second time interval to obtain subtracted pixel values, and detect a noise amount for each pixel of the plurality of pixels in the dark time based on the subtracted pixel values; and
determining a particular pixel as a defective pixel when the detected noise amount of the particular pixel is equal to or greater than a predetermined first threshold value.

17. An image forming apparatus, comprising:
circuitry to
obtain pixel values for at least a first time interval and pixel values for a second time interval, the second time interval being longer than the first time interval, the pixel values in dark time representing pixel values obtained when no light is input to a photoelectric conversion element having a plurality of pixels and that receives light reflected by a document placed on a document tray;
subtract the obtained pixel values for the first time interval from the obtained pixel values for the second time interval to obtain subtracted pixel values;
detect a noise amount for each pixel of the plurality of pixels based on the subtracted pixel values;
determine a particular pixel as a defective pixel when the detected noise amount of the particular pixel is equal to or greater than a predetermined first threshold value; and
correct a value of the determined defective pixel to a value of a normal pixel among pixel values of the plurality of pixels of the photoelectric conversion element.

* * * * *